United States Patent
Skvortsov et al.

(10) Patent No.: US 12,182,601 B2
(45) Date of Patent: Dec. 31, 2024

(54) SYSTEMS AND METHODS FOR CROSS MEDIA REPORTING BY FAST MERGING OF DATA SOURCES

(71) Applicant: Google LLC, Mountain View, CA (US)

(72) Inventors: Evgeny Skvortsov, Mountain View, CA (US); Shen-fu Tsai, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 612 days.

(21) Appl. No.: 17/396,563

(22) Filed: Aug. 6, 2021

(65) Prior Publication Data

US 2022/0091873 A1   Mar. 24, 2022

Related U.S. Application Data

(60) Provisional application No. 63/082,980, filed on Sep. 24, 2020.

(51) Int. Cl.
G06F 9/455   (2018.01)

(52) U.S. Cl.
CPC ............ *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,910,195 B1 | 12/2014 | Barney | |
| 9,754,035 B2* | 9/2017 | Rao | G06F 16/9535 |
| 9,934,311 B2* | 4/2018 | Haeupler | G06F 16/951 |
| 10,484,233 B2* | 11/2019 | Cheng | H04L 41/042 |
| 11,017,220 B2* | 5/2021 | Huang | G06F 18/24 |
| 11,109,085 B2* | 8/2021 | Rao | H04N 21/2668 |
| 11,823,015 B2* | 11/2023 | Grossman | G06F 9/4806 |
| 2016/0165277 A1 | 6/2016 | Kirillov et al. | |
| 2019/0116392 A1 | 4/2019 | Vinson et al. | |

(Continued)

OTHER PUBLICATIONS

Kulkarni et al. "HyperLogLog Sketch Acceleration on FPGA", 2020 IEEE, pp. 47-56.*

(Continued)

*Primary Examiner* — Van H Nguyen

(74) *Attorney, Agent, or Firm* — DORITY & MANNING P.A.

(57) ABSTRACT

Systems and methods for fast merging of panelist activity are disclosed. The system can maintain a plurality of panelist identifiers each stored with a respective plurality of offline content events, and identify, from the plurality of panelist identifiers, a subset of panelist identifiers that are stored with a respective offline content event that matches a target offline content event. The system can map each of the subset to a respective plurality of unique identifiers corresponding to virtual devices having virtual device attributes. The system can reduce, for each of the subset, the respective plurality of unique identifiers to a sketch that represents the respective plurality of unique identifiers. The system can combine the sketch of each of the subset of panelist identifiers into an aggregated sketch, and transmit the aggregated sketch to a computing device for analysis with an aggregated sketch representing online content events.

18 Claims, 16 Drawing Sheets

(56) References Cited

U.S. PATENT DOCUMENTS

2019/0236287 A1   8/2019   Remy et al.
2019/0245635 A1   8/2019   Verkasalo et al.

OTHER PUBLICATIONS

Zhou et al. "Per-Flow Cardinality Estimation Based On Virtual LogLog Sketching", 2019 IEEE, 6 pages.*
International Search Report and Written Opinion for Application No. PCT/US2021/051873, mailed Jan. 14, 2022, 14 pages.
International Preliminary Report on Patentability for Application No. PCT/US2021/051873, mailed Apr. 6, 2023, 10 pages.

* cited by examiner

SYSTEMS AND METHODS FOR CROSS MEDIA REPORTING BY FAST MERGING OF DATA SOURCES

RELATED APPLICATIONS

The present application claims the benefit of and priority to U.S. Provisional Patent Application No. 63/082,980, entitled "Cross Media Reporting by Fast Merging of TV Panelist Activity and YouTube Log," filed Sep. 24, 2020, the entirety of which is incorporated by reference herein.

BACKGROUND

In many instances, computing and data analysis systems may determine the intersection, or union, of large sets of data as part of analysis or processing of the data. Computing the union, intersection, or frequency of large sets of data distributed across multiple sources typically involves sharing information about the large sets of data between the multiple sources. Information from each source can include private or protected information, and sharing such information may negatively impact privacy and security.

SUMMARY

At least one aspect of the present disclosure relates to a method for cross media reporting by fast merging of panelist activity. The method may include maintaining, by a data processing system including one or more processors and a memory, a plurality of panelist identifiers each stored with a respective plurality of offline content events. The method may include identifying, by the data processing system, from the plurality of panelist identifiers, a subset of panelist identifiers that are stored with a respective offline content event of the respective plurality of offline content events that matches a target offline content event. The method may include mapping, by the data processing system, each of the subset of panelist identifiers to a respective plurality of unique identifiers corresponding to virtual devices having virtual device attributes. The method may include reducing, by the data processing system, for each of the subset of panelist identifiers, the respective plurality of unique identifiers to a sketch that represents the respective plurality of unique identifiers. The method may include combining, by the data processing system, the sketch of each of the subset of panelist identifiers into an aggregated sketch. The method may include transmitting, by the data processing system, the aggregated sketch to a computing device for analysis with an aggregated sketch representing online content events.

In some implementations, generating the sketch for each of the subset of the plurality of panelist identifiers can include reducing, for each of the subset of the plurality of panelist identifiers, the respective plurality of unique identifiers to the sketch that represents the respective plurality of unique identifiers further based on a sampling technique. In some implementations, the sampling technique is deep-sketch subsampling. In some implementations, the method can include determining a weight for each of the plurality of panelist identifiers.

In some implementations, mapping each of the subset of the plurality of panelist identifiers to the respective plurality of unique identifiers is further based on the weight for each of the subset of the plurality of panelist identifiers. In some implementations, combining the sketch of each of the subset of the plurality of panelist identifiers into the aggregated sketch can include determining a maximum register value across the sketches of each of the subset of the plurality of panelist identifiers. In some implementations, combining the sketch of each of the subset of the plurality of panelist identifiers into the aggregated sketch can include selecting a value of a position corresponding to the maximum register value for each position across the sketches of each of the subset of the plurality of panelist identifiers as a value of a corresponding position in the aggregated sketch.

In some implementations, generating the sketch for each of the subset of the plurality of panelist identifiers can include generating a Hyper-Log-Log (HLL) sketch for each of the subset of the plurality of panelist identifiers. In some implementations, mapping each panelist identifier of the subset of the plurality of panelist identifiers to the respective plurality of unique identifiers is further based on matching attribute data of the panelist identifier to attribute data of each of the respective plurality of unique identifiers. In some implementations, In some implementations, maintaining the plurality of panelist identifiers each stored in association with the respective plurality of offline content event identifiers can include receiving a message from a panelist computing device corresponding to a panelist identifier of the plurality of panelist identifiers, the message identifying a respective offline event. In some implementations, maintaining the plurality of panelist identifiers each stored in association with the respective plurality of offline content event identifiers can include storing an identifier of the respective offline event identified in the message in association with the panelist identifier.

At least one other aspect of the present disclosure relates to a system configured for cross media reporting by fast merging of panelist activity. The system may include a data processing system comprising one or more processors coupled to memory. The data processing system can maintain, by a data processing system including one or more processors and a memory, a plurality of panelist identifiers each stored with a respective plurality of offline content events. The data processing system can identify, by the data processing system, from the plurality of panelist identifiers, a subset of panelist identifiers that are stored with a respective offline content event of the respective plurality of offline content events that matches a target offline content event. The data processing system can map, by the data processing system, each of the subset of panelist identifiers to a respective plurality of unique identifiers corresponding to virtual devices having virtual device attributes. The data processing system can reduce, by the data processing system, for each of the subset of panelist identifiers, the respective plurality of unique identifiers to a sketch that represents the respective plurality of unique identifiers. The data processing system can combine, by the data processing system, the sketch of each of the subset of panelist identifiers into an aggregated sketch. The data processing system can transmit, by the data processing system, the aggregated sketch to a computing device for analysis with an aggregated sketch representing online content events.

In some implementations, to generate the sketch for each of the subset of the plurality of panelist identifiers, the data processing system is further configured to reduce, for each of the subset of the plurality of panelist identifiers, the respective plurality of unique identifiers to the sketch that represents the respective plurality of unique identifiers further based on a sampling technique. In some implementations, the sampling technique is deep-sketch subsampling. In some implementations, the data processing system is further configured to determine a weight for each of the plurality of panelist identifiers. In some implementations, the data processing system is further configured to map each of the subset of the plurality of panelist identifiers to the respective plurality of unique identifiers further based on the weight for each of the subset of the plurality of panelist identifiers.

In some implementations, to combine the sketch of each of the subset of the plurality of panelist identifiers into the aggregated sketch, the data processing system is further configured to determine a maximum register value across the sketches of each of the subset of the plurality of panelist identifiers. In some implementations, to combine the sketch of each of the subset of the plurality of panelist identifiers into the aggregated sketch, the data processing system is further configured to select a value of a position corresponding to the maximum register value for each position across the sketches of each of the subset of the plurality of panelist identifiers as a value of a corresponding position in the aggregated sketch.

In some implementations, to generate the sketch for each of the subset of the plurality of panelist identifiers, the data processing system is further configured to generate a Hyper-Log-Log (HLL) sketch for each of the subset of the plurality of panelist identifiers. In some implementations, to map each panelist identifier of the subset of the plurality of panelist identifiers to the respective plurality of unique identifiers, the data processing system is further configured to match attribute data of the panelist identifier to attribute data of each of the respective plurality of unique identifiers. In some implementations, to maintain the plurality of panelist identifiers each stored in association with the respective plurality of offline content event identifiers, the data processing system is further configured to receive a message from a panelist computing device corresponding to a panelist identifier of the plurality of panelist identifiers, the message identifying a respective offline event. In some implementations, to maintain the plurality of panelist identifiers each stored in association with the respective plurality of offline content event identifiers, the data processing system is further configured to store an identifier of the respective offline event identified in the message in association with the panelist identifier.

Yet another aspect of the present disclosure relates to a non-transient computer-readable storage medium having instructions embodied thereon, the instructions being executable by one or more processors to perform a method for cross media reporting by fast merging of panelist activity. The method may include maintaining, by a data processing system including one or more processors and a memory, a plurality of panelist identifiers each stored with a respective plurality of offline content events. The method may include identifying, by the data processing system, from the plurality of panelist identifiers, a subset of panelist identifiers that are stored with a respective offline content event of the respective plurality of offline content events that matches a target offline content event. The method may include mapping, by the data processing system, each of the subset of panelist identifiers to a respective plurality of unique identifiers corresponding to virtual devices having virtual device attributes. The method may include reducing, by the data processing system, for each of the subset of panelist identifiers, the respective plurality of unique identifiers to a sketch that represents the respective plurality of unique identifiers. The method may include combining, by the data processing system, the sketch of each of the subset of panelist identifiers into an aggregated sketch. The method may include transmitting, by the data processing system, the aggregated sketch to a computing device for analysis with an aggregated sketch representing online content events.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
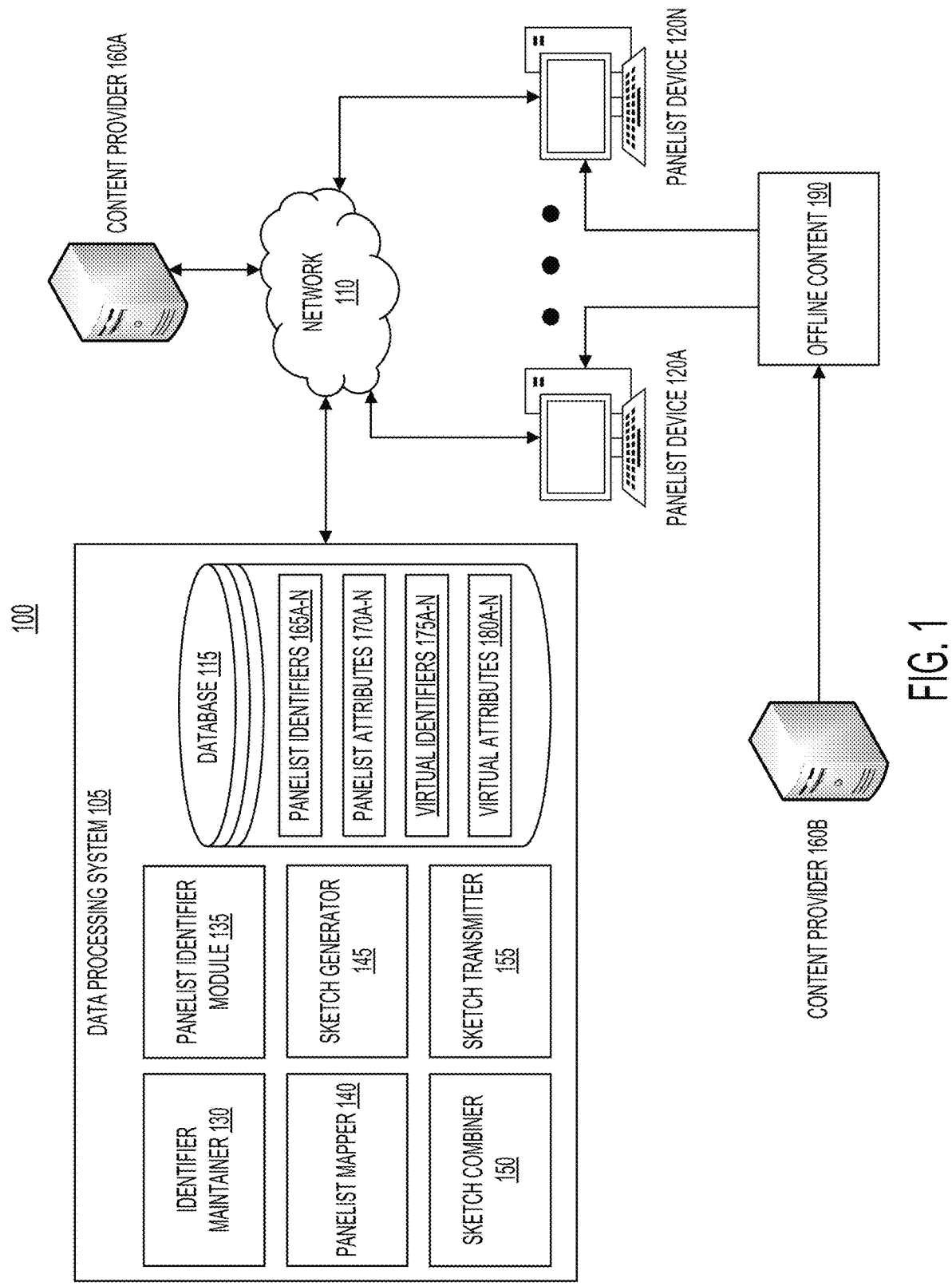
FIG. 1 illustrates a block diagram of an example system for cross media reporting by fast merging of panelist activity.

Below are detailed descriptions of various concepts related to, and implementations of, techniques, approaches, methods, apparatuses, and systems for cross media reporting by fast merging of panelist activity. The various concepts introduced above and discussed in greater detail below may be implemented in any of numerous ways, as the described concepts are not limited to any particular manner of implementation. Examples of specific implementations and applications are provided primarily for illustrative purposes.

Content providers can provide content to client devices in various online formats, such as text, images, video, webpages, and applications, among others. Content providers can also provide content in offline formats, such as a radio broadcast, video broadcast, or other types of one-to-many broadcasting formats, among others. The number and attributes of client devices that access online content can be easily monitored and analyzed, because online content is provided in response to requests. Requests for online content can include information about the client device making the request, and can be recorded in a database of a content provider for future processing. The amount of content provided, and attributes of the client devices to which the content is provided, can be gleaned by analyzing the stored content request information.

In contrast, offline content may not be provided in response to requests, and thus accurate one-to-one information about the devices that access offline content may not be maintained by content providers. To estimate the number or attributes of devices that access offline content, different techniques can be used with varying degrees of success. For example, content providers often utilize a panelist device that represents other similar devices that access offline content. The panelist device can monitor and locally record events associated with offline content accessed by the panelist computing device. The events can be reported to a content provider computing device, which can analyze and extrapolate those events to a larger population of devices, for example to estimate a number represented by the panelist computing device that accessed the offline content and engaged in similar offline content events. Attributes of the extrapolated devices can be estimated as well in a similar fashion.

However, extrapolation techniques produce datasets that are incompatible with those generated by the monitoring techniques for online content. If a content provider provides a content item, such as a video, text, an image, an audio stream, or any other type of content, in both offline and online formats, it can be challenging for the content provider to combine those datasets for a complete analysis. Further, when extrapolating very large data sets for analysis, it can be difficult to efficiently store and process information that produces accurate results in a computationally feasible way. It would therefore be advantageous for a system to provide improved monitoring and analysis techniques for offline content events, which can generate datasets that are easily processed and combined with those generated for online content.

The systems and methods of this technical solution provide such improvements. More particularly, the systems and methods described herein can maintain event messages received from panelist computing devices that engage with offline content. In addition, the systems and methods described herein can maintain and update associations between identifiers of panelist computing devices and corresponding lists of a unique identifiers that can represent virtual devices. The unique identifiers can each represent various attributes of a virtual user that would otherwise be attributed to a real user, such as gender, location, interests, and age, among other attributes. For each panelist identifier associated with target offline content events, the systems and methods described herein can generate a compressed data structure, or sketch, that represents the list of unique identifiers associated with each respective panelist.

Using compressed representations of the unique identifiers associated with each panelist provides improvements over other analysis systems. First, the sketches that represent the unique identifiers associated with each panelist can be computed in parallel, instead of sequentially computing and updating a single representative data structure for all panelists. The sketches generated for each panelist can be, for example, a HyperLogLog sketch or a LiquidLegions sketch (sometimes referred to as an exponential bloom filter (EBF) sketch or an Any Distribution Bloom Filter (ADBF) sketch). Those sketch formats are selected because they can be easily combined with other sketches that are generated using a common universe of unique identifiers.

Each panelist computing device can represent thousands or even millions of unique identifiers, posing computational challenges. However, further computational gains can be realized by analyzing only the panelists that engaged with target (e.g., specified) offline content. For example, in the case where a panelist is not associated with any events for target offline content, the unique identifiers associated with that panelist can be passed over, further improving computational performance. Once a representative sketch has been computed for each panelist computing device, the representative sketches can be combined into a final representative sketch. The final representative sketch can represent all of the unique identifiers that are associated with the target offline content, and can be analyzed together with other sketches, such as sketches generated from online content event information. Thus, the systems and methods described herein can accurately estimate and generate representative sketches for target offline content events in a way that is compatible with the sketches generated from online content events Generally, content providers, or aggregators of data from content providers, are able to report the number of unique devices that are "reached" (e.g., accessed, viewed, downloaded, interacted with, or any other type of impression, etc.) by content or content channels. This data can be and broken down by various device attributes (e.g., demographics such as age, gender, time, location, device information such as device type, web browser type, application type, date, device identifier, etc.), based on a first party log. A first-party log can be maintained in the memory or other data storage of a content provider, or other type of first party. To anonymize data, the information reporting can be reporting is "virtually" based. This means that instead of revealing personal information or actual identifying information about users, each content-related event (e.g., accessed content, viewed content, interacted with content, etc.) is associated with one or more virtual identifiers (sometimes referred to as "VPIDs" or "VIDs"), and with a corresponding event type. Accordingly, any content provider can analyze the VIDs to find the reach of any particular item or grouping of content.

But as described above, this approach does not apply to traditional offline content, such as television (TV) or radio (e.g., internet radio, amplitude-modulation (AM) radio, frequency-modulation (FM) radio, etc.). Other approaches do not utilize virtual identifiers, and thus do not include the granular attribute data associated with the virtual identifiers. Further, the techniques described herein readily accept additional analysis attributes (e.g., the specification of additional attributes stored in association with VIDs, etc.) for further analysis.

This disclosure describes at least two techniques, among others. The first includes a technique to associate, or map, panelist identifiers to virtual identifiers, and the second includes improving the speed of analyzing panelist-VID mappings using deep sketch sampling. The techniques described herein can utilize a VID model filled with virtual identifiers of various attributes that reflect an actual audience for content (e.g., roughly 328.2 million virtual identifiers for the United States, how many are male or female, have access to television or internet, live in various locations, etc.).

To perform VID-panelist mapping, the systems and methods described herein can receive panelist activity from panelist computing devices. The systems and methods described herein can extrapolate the panelist computing device activity (e.g., content events performed or associated with the panelist computing device, etc.) by a weight value of each panelist computing device. For example, if a first panelist computing device has a weight value of 10,000, and that panelist accesses a particular content item, that information can be extrapolated to identify 10,000 VIDs (e.g., having similar attributes) that represent user devices that would likely access the same content. The panelist-VID association is such that (1) every VID is associated with exactly one panelist computing device, and (2) every panelist is associated with VIDs proportional to their corresponding weight value.

Intuitively, the systems and methods could just find 10K VIDs with access to the offline content medium from a similar location (e.g., from the same region, etc.) and demographic bucket (e.g., similar demographic information, etc.) or attributes as the panelist computing device, and associate them together. However, there may be hundreds or thousands of panelist computing devices in the same geo-demo bucket, and how do we do it more systematically? Moreover, if tomorrow the panelist's weight drops from 10K to 9.9K, the VID associations must be updated in a way that does not over-utilize computing resources. Further, content providers may run reports that span across today and tomorrow, so the VIDs associated with various panelists should not change too much, otherwise inconsistent results could be generated.

One solution is to use affinity hashing. Essentially, suppose in a geo-demo pool there are Q panelists with weights $w\_1, w\_2, \ldots, w\_Q$ and P VIDs. For each panelist-VID pair $(q, p)$ where q is between 1 and Q inclusive and p is between 1 and P inclusive, a negative of an exponential pseudo random variable with rate $w\_q$ as affinity score $A(q, p)$ can be generated. And then each VID p can pick panelist q' with the highest affinity score between them (e.g. $A(q', p)$ is greater than $A(q'', p)$ for any other q'' between 1 and Q inclusive). The property of exponential variable is such that in this way, panelists will be associated with VIDs proportional to their panelist weight, (e.g. a panelist with weight 1000 expects to associate with twice as many VIDs as another panelist with weight 500, etc.). Said another way, for each VIDs in the geo-demo bucket, a panelist with probability proportional to their individual weight can be sampled. Affinity hashing can be based in when doing the sampling.

The number of associated VIDs to panelists $1, 2, \ldots, Q$ can be proportional to their weights $w\_1, w\_2, \ldots, w\_Q$ modulo negligible binomial sampling variance, and the number of total associated VIDs can be P, the number of available VIDs. So once P is fixed, panelist weights can be taken relatively, (e.g., if all weights are multiplied by 10, the same association results, etc.). Therefore, if every panelist is to be associated with as many VIDs as its weight, P can be made equal to a sum of panelist weights $w\_1 + w\_2 + \ldots + w\_Q$.

For each panelist, when reporting various content events, the viewing or content activity of the panelist can be extrapolated to the associated VIDs, which can be followed by deduplication with online content events. This can result in a complete picture of content events associated with virtual identifiers across online and offline content. However, storing thousands of VIDs (e.g., and associated attributes of each VID, etc.) per panelist can be computationally expensive and may not scale efficiently. Thus, the systems and methods described herein can utilize a HyperLogLog (HLL) sketch, which can be a data structure usable for approximate unique object counting. A HLL sketch can (1) approximately encode the associated VIDs of each panelist; (2) takes storage constant space in computer memory regardless of how many VIDs are associated with a panelist; and (3) could be easily merged with another HLL sketch representing other content events (e.g. online content events, content events from other content providers, etc.) in constant time to arrive at an aggregate reach value across both online and offline content events. Thus, the systems and methods described herein can generate an HLL sketch (or any other type of sketch described herein, etc.) for each panelist computing device that represents the VIDs (e.g., and attributes associated with the VIDs, etc.) associated with each respective panelist. These sketches can be subsequently merged for further processing.

To improve the computational efficiency of those steps, deep sketch sampling can be utilized. As described above, associating panelists and VIDs may include the computation of an affinity score for each panelist-VID pair within a geo-demo bucket (e.g., grouping of geographical or demographical similarities, etc.), which can be computationally expensive. The systems and methods described herein can avoid such expensive operations while still obtaining quality approximation of an HLL sketch. To do so, the systems and methods described herein can aggregate all VIDs into an initial "deep" sketch, and subsequently sample from the registers in the deep sketch to obtain sketches for each desired panelist without compromising the accuracy of the reach estimation.

Before illustrating such a solution, it may be helpful to first explain at a high level how a HLL sketch works in the context of counting unique VPIDs. A HLL sketch can include thousands of registers, typically 2 to the 14, or roughly 16K registers. However, other numbers of registers may be used. When a new VPID is to be included in a sketch, it can be pseudo randomly directed to one of the 16K registers and processed there. Each register can be either empty or holds a register sketch, a number between 0 and 1. Within a register, the incoming VPID can be hashed to a uniform pseudo random variable between 0 and 1. If the hashed value is smaller than the existing register sketch, the latter can be updated to be equal to the former. In other words, if a register has processed R unique VPIDs, then it holds the minimum of R corresponding uniform random variables. Mathematics says this minimum has distribution close to exponential random variable with rate R, so it could later provide an approximate unique count of the number of VPIDs that contributed to the register. Finally, unique count across registers can be aggregated to obtain total cardinality estimate of the VPIDs that were directed to the sketches.

Rather than HLL sketch level, the optimization techniques described above can operate on the register level (e.g., implemented at each of the registers of the HLL sketch, etc.). Thus, the techniques described with respect to those optimizations are from the perspective of a single register in the HLL sketch. The techniques described herein with respect to deep sketch subsampling can sampled from, for example, a deep sketch that is generated using all of the VIDs maintained by the systems and methods described herein. The goal is to arrive at a register sketch for every panelist without actually going through association described in the last section. Define pool as the set of VIDs with the same attributes that go to a particular register, and a deep pool sketch as the D smallest uniform pseudo random variables mapped from all VIDs in the pool, where D is a predefined depth. In other words, deep pool sketches $s\_1 <= s\_2 <= \ldots <= s\_D$. The VID that generates $s\_1$ can be associated with a certain panelist, and so is the VID that generates $s\_2$, etc. So from $s\_1$ to $s\_2$ to ... to $s\_D$, for each element of the deep pool sketch, using affinity hashing a panelist with probability proportional to their weight can be picked. Let the element be the register of the panelist sketch if the latter has not been assigned. Say panelist 3 is assigned $s\_2$ and $s\_4$, then his or her register sketch is $s\_2$ because $s\_4$ comes later.

Clearly, if depth D is infinity, then this can be equivalent to normal association, and there is no speed up. However, D can be as small as 10, and so after the above process at most D panelists are assigned a register sketch and the rest still are given no register sketch. Suppose the pool has P VIDs. So far, only the register sketches from D have been associated with panelists and the rest, P−D, have not. First, a sampling from multinomial distribution based on weights $w\_1, w\_2, \ldots, w\_Q$ can be obtained to decide how these P−D distribute among Q panelists. Say the distribution is $b\_1, b\_2, \ldots, b\_Q$, which can sum up to P−D. Then, for each panelist q still unassigned to a register sketch, if $b\_q$ is zero, then the register sketch of the panelist can be finalized as empty. Otherwise, the register sketch of the panelist can be set to the minimum of $b\_q$ uniform pseudo random variables between $s\_D$ and 1, remembering that $s\_D$, a register sketch itself, can also lies between 0 and 1. Put simply, the systems and methods can identify that the minimum of $b\_q$ uniform random variables is between $s\_D$ and 1, and can sample accordingly. Note the last sampling can be achieved quickly using Inverse Transform Sampling (ITS), and therefore does not take time proportional to $b\_q$.

After going through each register of the deep sketch with the above procedure, the systems and methods described herein can eventually compute a register sketch for every panelist and every register. The register sketches for each panelist can then be put together generate a HLL sketch of the panelist for further analysis. It can be shown that a large value of D may not be needed for accurate results, and a depth of 1 or even 0 may suffice for a desired outcome. If large reach values are to be determined, then it may be reasonable to consider a larger depth value, because we need a HLL sketch representing offline content events must intersect reasonably with a HLL sketch representing online content events. This can corresponds to an aggregate HLL sketch representing VIDs that accessed both online and offline content. A theoretical bound has been derived for total reach error due to finite depth justified by experiment. For example, in some experiments and in certain conditions, a depth of 10 may achieve a relative error of 1%.

The systems and methods described herein can perform attribute matching between VIDs and panelist identifiers. For example, one step can include grouping VIDs and panelist identifiers having the same attributes together. Each VID can be associated with a set of location identifiers at various granularities, which can be matched against a location identifier of each panelist.

Next, for any given event (e.g., content events, etc.), each panelist can be associated with a weight value. In some implementations, the weight value can be assigned on a daily basis. For example, a panelist's weight could vary across days, which may result in different numbers of VIDs represented by the panelist every day. This can preserve reach consistency. Although in this scenario a panelist identifier could represent different numbers of people on different days, utilizing weighted consistent hashing can reduce the shuffling of VIDs between panelists.

In some implementations, the weight values for active panelists (e.g. those engaging in a number of offline content events that is greater than a predetermined threshold, etc.) can be rescaled to match the entire population of VIDs, and all other panelist weights can be set to zero. This means that if the maximum reporting window is a predetermined time window (e.g., 90 days, etc.), then any given event can have a predetermined number of weights (e.g., corresponding to the time window, 90 weights for 90 days, etc.) corresponding to all time windows.

The association of VIDs to panelist identifiers can be performed based on the weight and pool size. If the weight is determined by a day-by-day basis, or if the weight is determined for a date range, a panelist p with weight $w_p$ can be associated with $$\frac{P w_p}{\Sigma_{p \in P} w_p}$$

VIDs in the pool, where P can be the pool size. To reduce the shuffling in association caused by weight change, weight consistent hashing (sometimes referred to as "affinity hashing") can be used to pick the associated $$\frac{P w_p}{\Sigma_{p \in P} w_p}$$

VIDs. This can work in the reverse direction. For each VID, the probability they're picked by panelist p can be $$\frac{\Sigma_{p \in P} w_p}{w_p}.$$

The weight of a panelist can be proportional to the population they represent. As described above, the one step in generating a panelist-to-VIDs mapping includes assigning VIDs to a panelist in proportion to the weight of the panelist. Therefore, how and when the weight values of the panelists changes can significantly affect the panelist-to-VID mapping. Some possible weight changing scenarios are included below.

In one approach, a panelist can have a weight value that can depend on a particular time period (e.g., on a daily basis, weekly basis, etc.) regardless of which offline content events they engage in, if any. The mapping can generated offline, and can be keyed (e.g., indexed, etc.) by date. There can be 2*365=730 mappings from panelist identifiers to VIDs, for example.

Another approach includes weighting the panelists by interval. In such a scenario, $C(2*365, 2) \approx 266K$ mappings can be generated. For example, every day the systems and methods can generate and retire 2*365−1=729 mappings. However, this may not guarantee consistency.

As described herein, deep sketch subsampling can be used to improve the computational performance of the HLL sketch computation process without significantly impacting reach estimation accuracy. The experimental data included herein (e.g., in FIGS. 10A-15B, etc.) indicate a 1.5% relative error produced by deep sketch subsampling can be reasonable. For union of disjoint subsets and another independent subsets representing online content events, an approximate theoretical upper bound on the relative error is derived, and thereby the needed depth of deep sketch subsampling can be determined.

Given Q panelists and a pool P with |P| VIDs, panelist-VIDs association can take $O(Q|P|)$ operations since it produces the outer product of panelist and VIDs when each VID is assigned a panelist. Although complexity $O(Q|P|)$ can be computationally affordable for some systems, the computation for large datasets can still take longer than what is considered acceptable for some implementations (e.g., smaller time windows, etc.). Using the techniques described herein, the process can be improved to $O(QD+|P|\log_2 D+|P|\log_2 Q)$ by approximating the HLL sketch for panelists that engaged in offline content events where D is the predetermined depth value.

In the description that follows, panelist (sometimes referred to as "panelist identifier" and subset can be interchangeable since subsets of VIDs of the VID pool are assigned to panelists (e.g., a panelist identifier, etc.).

In a HLL sketch, elements added to the sketch can be distributed to the registers of the sketch randomly. In each register, each element can be hashed to an exponential random variable. The minimum exponential random variable for that register can be stored in that register, which can carry a robust signal about cardinality.

When sketches are generated to approximate panelists-VIDs association mapping, at least two goals can be achieved. One goal can be a volume goal. For a volume goal, the sketch can be such that the number of associated VIDs can be proportional to the panelists weight. Another goal can be an interaction goal, which means that the sketch can be merged with sketches that represent online content events to estimate a de-duplicated reach across both platforms (e.g., the sketches from different spaces "interact" properly). One way to meet the volume goal is through deep sketch subsampling. One way to meet the interaction goal is through deriving or determining an appropriate depth value for the deep sketch subsampling. The approaches for deep sketch subsampling are described herein below in conjunction with FIGS. 3-7.

Referring now to FIG. 1, illustrated is a block diagram of an example system 100 for cross media reporting by fast merging of panelist activity, in accordance with one or more implementations. The system 100 can include at least one data processing system 105, and at least one network 110, one or more panelist devices 120A-N (sometimes generally referred to as "panelist device(s) 120"), one or more content providers 160A-N (only A-B depicted, sometimes generally referred to as "content provider(s) 160"), and at least one database 115. The data processing system can include at least one identifier maintainer 130, at least one panelist identifier module 135, at least one panelist mapper 150, at least one sketch generator 145, at least one sketch combiner 150, and at least one sketch transmitter 155. The database 115 can include one or more panelist identifiers 165A-N (sometimes generally referred to as "panelist identifier(s) 165"), one or more panelist attributes 170A-N (sometimes generally referred to as "panelist attribute(s) 170"), one or more virtual identifiers 175A-N (sometimes generally referred to as "virtual identifier(s) 175"), and one or more virtual attributes 180A-N (sometimes generally referred to as "virtual attribute(s) 180"). In some implementations, the database 115 can be external to the data processing system 105, and the data processing system 105 or its components can query the database 115 via the network 110.

Each of the components (e.g., data processing system 105, the network 110, the panelist devices 120A-N, the content providers 160A-N, the database 115, the identifier maintainer 130, the panelist identifier module 135, the panelist mapper 150, the sketch generator 145, the sketch combiner 150, and the sketch transmitter 155 the panelist identifiers 165A-N, the panelist attributes 170A-N, the virtual identifiers 175A-N, and the virtual attributes 180A-N, etc.) of the system 100 can be implemented using the hardware components or a combination of software with the hardware components of a computing system (e.g., computing system 900, the data processing system 105, any other computing system described herein, etc.) detailed herein in conjunction with FIG. 900. Each of the components of the data processing system 105 can perform the functionalities detailed herein.

The data processing system 105 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of the computer system 900 described herein in conjunction with FIG. 9.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one content provider 160 or at least one panelist device 120. The network 110 may be any form of computer network that can relay information between the panelist devices 120, the content providers 160, the data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 105, the computer system 900, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105, the computer system 900, etc.) may also communicate wirelessly with the computing devices of the network 110 via a proxy device (e.g., a router, network switch, or gateway).

The database 115 can be a database configured to store and/or maintain any of the information described herein. The database 115 can maintain (e.g., store, etc.) one or more data structures, which may contain, index, or otherwise store each of the values, pluralities, sets, variables, vectors, or thresholds described herein. The database 115 can be accessed using one or more memory addresses, index values, or identifiers of any item, structure, or region maintained in the database 115. The database 115 can be accessed by the components of the data processing system 105, or any other computing device described herein, via the network 110. In some implementations, the database 115 can be internal to the data processing system 105. In some implementations, the database 115 can exist external to the data processing system 105, and may be accessed via the network 110. The database 115 can be distributed across many different computer systems or storage elements, and may be accessed via the network 110 or a suitable computer bus interface. The data processing system 105 (or any components thereof) can store, in one or more regions of the memory of the data processing system 105, or in the database 115, the results of any or all computations, determinations, selections, identifications, generations, constructions, or calculations in one or more data structures indexed or identified with appropriate values. Any or all values stored in the database 115 may be accessed by any computing device described herein, such as the data processing system 105, to perform any of the functionalities or functions described herein.

The panelist devices 120 can each include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The panelist devices 120 can each include one or more computing devices or servers that can perform various functions as described herein. The panelist devices 120 can each include any or all of the components and perform any or all of the functions of the computer system 900 described herein in conjunction with FIG. 9.

Each of the panelist devices 120 can be computing devices configured to communicate via the network 110 to transmit or receive messages to or from the data processing system 105 or the content provider 160. The panelist devices 120 can be desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The panelist devices 120 can transmit one or more requests for content to a content publisher, a content provider 160, or data processing system 105. The panelist devices 120 can receive online content from the device to which the request was transmitted, where the content is selected based on device information (e.g., device model, device type, device operating system, device operating system version, device time, device date, any other context information described herein, etc.) about the client device 120 responsible for the request.

The panelist devices 120 can access offline content 190, for example from one or more cable modems (e.g., external or internal to the panelist device 120, etc.), fiber-optic endpoints, radio broadcasts (including television broadcasts, etc.). The offline content can include any kind of television broadcasts (e.g., via cable network, fiber network, hybrid network, or radio transmission, etc.), radio broadcasts (e.g., AM radio, FM radio, internet radio, etc.), or any other type of offline (e.g., not provided in a one-to-one manner) content broadcast (e.g., including internet live-streams, streaming video, streaming audio, etc.). The panelist devices 120 can receive offline content, for example, from one or more content providers 160 that are configured to provide offline content via any of the means described herein above. Each of the panelist devices 120 can be assigned to an identifier that can be unique to the panelist device 120, and stored in the database 115 as the panelist identifier 165. In addition, each of the panelist devices 120 can be associated with panelist attributes (e.g., demographic information such as age, interests, gender, etc., and location information such as region, coordinates, or other location information, etc., as well as any type of interests or other information).

The panelist devices 120 can report information about offline content events to the data processing system 105. If a panelist device 120 accesses one or more items of offline content (e.g., a television program, a radio program, any other type of offline content, etc.), the panelist device 120 can record this event in the memory of the panelist device 120 as a content event. The content event can be recorded to include information about other such events, such as the duration that the panelist device 120 accessed the offline content associated with the event, the time of day the panelist device 120 accessed the offline content associated with the event, whether the panelist device accessed other offline content (e.g., switched between offline content, etc.), and which other offline content was accessed by the panelist device 120. Each content event can be associated with one or more identifiers of the offline content that was accessed (e.g., channel identifier, program identifier, etc.). The panelist device 120 can transmit information about each content events, including all identifiers and associated information, to the data processing system 105 in one or more content event messages. The content event messages can include any of the information associated with content events as described herein, and can include an identifier 165 of the panelist device 120, and in some implementations, the attributes of the panelist device 120.

The content provider 160 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content provider 160 can include one or more computing devices or servers that can perform various functions as described herein. The content provider 160 can include any or all of the components and perform any or all of the functions of the computer system 1000 described herein in conjunction with FIG. 10.

The content provider 160 can provide one or more information resources, which can include, or include scripts to retrieve, online content. The content provider 160 can record which client devices access online content items, including the time, identifiers, and attributes of client devices that access the online content. The content provider 160 can provide content items for display with embedded videos. The content items can include in-line content and overlay content. In-line content can be displayed in place of the hosted video for a finite period of time in a manner analogous to a news flash, emergency broadcast, or commercial displayed during a traditional television broadcast. Overlay content can be displayed on top of the embedded video. Overlay content can include any suitable content such as picture-in-picture video, a pop-up notification, or banner. The content provider 160 can provide online content in response to one or more requests for content from client devices. Thus, the content provider 160 can provide, and record content events, on a one-to-one basis with requesting devices. This information can be tracked and maintained in the memory of the content provider 160, and additional processing can be used to generate sketches that represent the client devices that accessed a specified content item or campaign.

Some content providers (e.g., the content provider 160B) can provide offline content 190. Such content providers 160 can broadcast content, for example via a cable network, a fiber-optic network, a hybrid network, or a radio transmission. Because the offline content 190 can be broadcast, and is not delivered on a one-to-one basis like online content, the content providers 160 that provide offline content do not maintain information about the offline content that is accessed by offline content devices (e.g., such as the panelist device 120). Although the panelist devices 120 can communicate offline content events to the data processing system 105, the panelist devices 120 represent a fraction of the number of devices that access the offline content 190. Thus, the attributes of the devices that access the offline content 190 is largely unknown to the content providers 160. To solve this issue, the data processing system 105 performs the functionalities described herein to accurately estimate the attributes of the devices that access the online content, based on the attributes of the panelists that access the offline content.

The panelist identifiers 165 that are maintained in the database 115 can be stored in one or more data structures, such as a list or indexed lookup. Each of the panelist identifiers can be associated with one or more panelist attributes 170 that described a particular panelist device 120. Thus, each panelist device 120 is associated with a respective panelist identifier 165 and a respective group of panelist attributes 170. When determining the data processing system 105 receives a message describing an offline content event, the data processing system 105 can associate that event with the appropriate panelist identifier 165 (e.g., the identifier that corresponds to the panelist device from which the message was received, etc.), and the panelist attributes 170 of that panelist device. The message, or the contents thereof that describe the offline content event, can be stored in the memory of the data processing system 105.

The panelist attributes 170 can include attributes that are associated with a respective panelist device 120, and can be stored in one or more lists or indexed data structures in the database 115. The panelist attributes 170 can include demographic information, such as age, gender, interests, and other demographic information, and can include location information at various granularities, including region information, coordinate information, or other types of location information. Each grouping of panelist attributes 170 can be associated with a respective one panelist device 120 and a respective one panelist identifier 165.

The virtual identifiers 175 can be identifiers of a virtual user or a virtual device. A virtual device is a device that may have general attributes or characteristics that could represent a user or device, but does not represent an actual real-life device. A virtual identifier can be a unique identifier that is stored in association with a respective one or more virtual attributes 180. Each of the virtual identifiers 175 can be mapped, for example by the panelist mapper 140, to a panelist identifier 165 having similar or identical attributes.

The virtual attributes 180 can be stored in association with a respective one virtual identifier 175, and can describe the attributes of the virtual device or virtual user to which the virtual identifier corresponds. The virtual attributes 180 can include demographic information, such as age, gender, interests, and other demographic information, and can include location information at various granularities, including region information, coordinate information, or other types of location information.

Identifier maintainer 130 can maintain, the panelist identifiers 165 stored in association with a respective one or more offline content events. For example, the identifier maintainer 130 can receive the messages describing offline content events from the panelist devices 120, and can match the offline content event contained in the message to a particular panelist identifier 165. The panelist identifier 165 can be included in the message that reports the offline content event. The identifier maintainer 130 can store any or all information about the offline content event (including type of event, or any other offline content event information described herein, etc.) in association with an identifier of the offline content item that was subject to the offline content event, and the panelist identifier 165 that reported the offline content event. These associations can be stored in one or more data structures in the memory of the data processing system 105 or in the database 115.

The panelist identifier module 135 can identify a subset of panelist identifiers that are associated with a particular offline content event. In some implementations, the panelist identifier module 135 can a request for a sketch that represents the virtual audience of an item of offline content. In response to the request, the panelist identifier module 135 can identify, from the panelist identifiers 165, a subset of panelist identifiers that are stored with a respective offline content event that matches a target offline content event specified in the request. To do so, the panelist identifier module 135 can iterate through each of the panelist identifiers 165 to identify which of the panelist identifiers are associated with the event (e.g., matching any target offline content during a specified time period, etc.). In some implementations, the panelist identifier module 135 can construct a list or another type of data structure that includes the identified subset of the panelist identifiers 165 that meet the criteria identified in the request for the sketch.

The panelist mapper 140 can map each of the subset of panelist identifiers to one or more VIDs 175. The panelist mapper 140 can map the identifiers in a variety of various ways. Some of which can include deep sketch subsampling, which might occur after or during the generation of a deep sketch (e.g., for example after the sketch generator 145 generates a sketch representing all VIDs 175, etc.). In some implementations, the panelist mapper 140 can identify a weight value associated with each of the subset of panelist identifiers. The weight value can be proportional to the number of VIDs 175 to which the panelist identifier can be mapped. In some implementations, the weight value is assigned in an offline process. In some implementations, the weight value is received from the panelist device 120 or from another computing device associated with the panelist device 120 via the network 110.

The panelist mapper 140 can associate VIDs 175 to panelist identifiers 165 (sometimes referred to herein as "panelist(s)") based on the weight and pool size. If the weight is determined by a day-by-day basis, or if the weight is determined for a date range, a panelist p with weight $w_p$ can be associated with $$\frac{Pw_p}{\Sigma_{p \in P} w_p}$$

VIDs 175 in the pool, where P can be the pool size. To reduce the shuffling in association caused by weight change, weight consistent hashing (sometimes referred to as "affinity hashing") can be used to pick the associated $$\frac{Pw_p}{\Sigma_{p \in P} w_p}$$

VIDs. This can work in the reverse direction. For each VID, the probability they're picked by panelist p can be $$\frac{\Sigma_{p \in P} w_p}{w_p}.$$

Each panelist identifier 165 can be assigned to one or more virtual identifiers 175, and each virtual identifier 175 can be assigned to one panelist identifier 165. In some implementations, the VIDs 175 to which the panelists 165 are mapped can be determined by identifying matches between the respective panelist attributes 170 and the virtual attributes 180.

Figure 2:
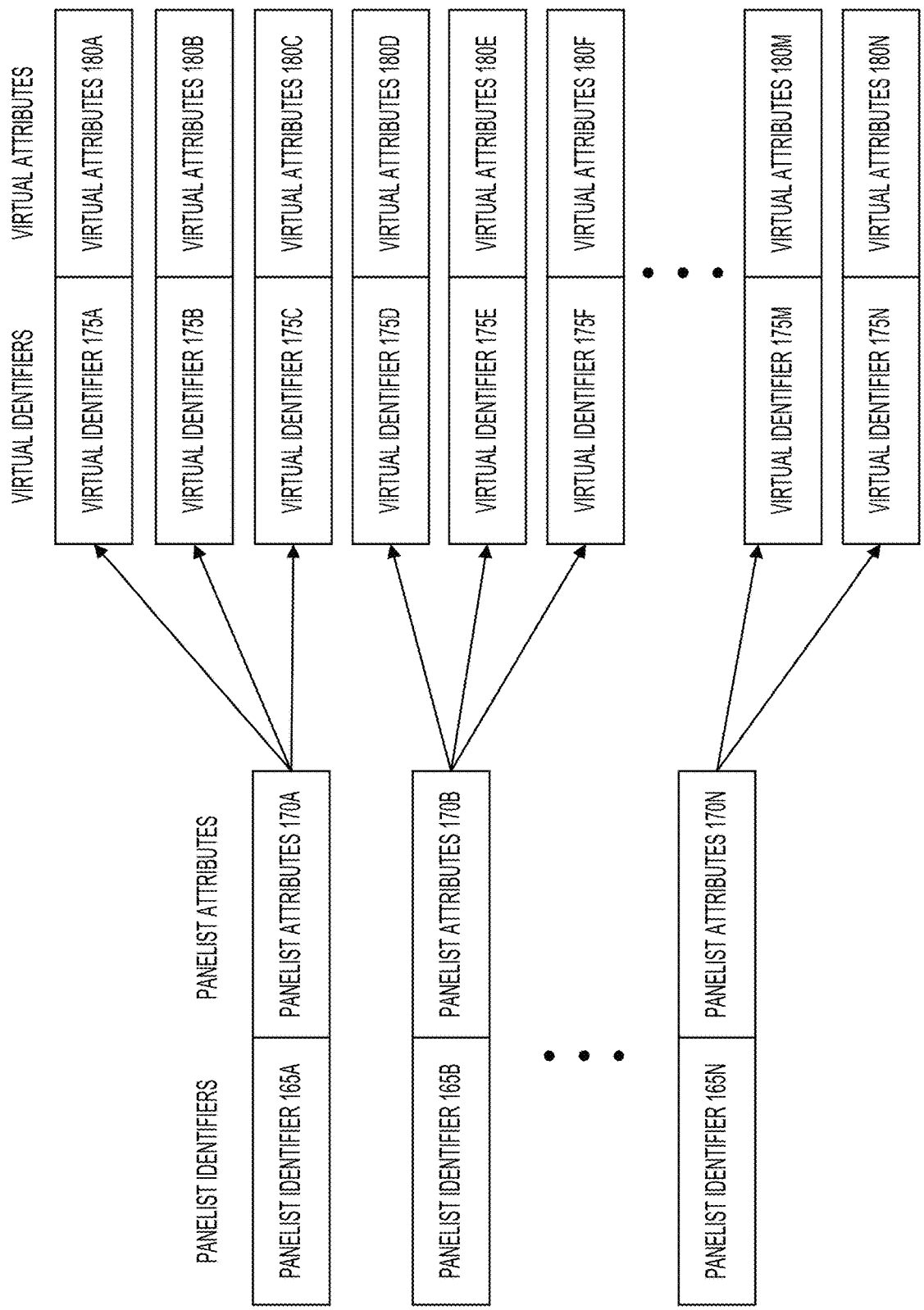
FIG. 2 illustrates a block diagram of an example representation of a mapping between panelist identifiers and virtual identifiers.

Referring briefly now to FIG. 2, depicted is an example mapping of panelist identifiers 165 (and associated panelist attributes 170) to corresponding virtual identifiers 175 (and associated attributes 180). As depicted in FIG. 2, each of the panelists can be associated with one or more VIDs 175, but the VIDs 175 can be associated with just one panelist 165. Further, the example weight value of panelist 165A would be 3, the example weight value of panelist 165B would 3, and the example weight value of panelist 165N would be 2. The Referring back now to FIG. 1, the panelist mapper 140 can generate the mapping of the panelist identifiers to the VIDs 175 based on matching attribute data. For example, the panelist mapper 140 can compare attribute data of the panelist identifiers 165 to the virtual attributes 180, and assign a mapping to corresponding VIDs 175 that have matching attribute data. This can be performed in accordance with the weight values, such that the number of VIDs 175 associated with any given panelist are proportional to the weight value of that panelist. The panelist mapper 140 can store the results of this mapping as an adjacency list, a graph matrix data structure, or any other type of data structure, in the memory of the data processing system 105 or the database 115.

Figure 4:
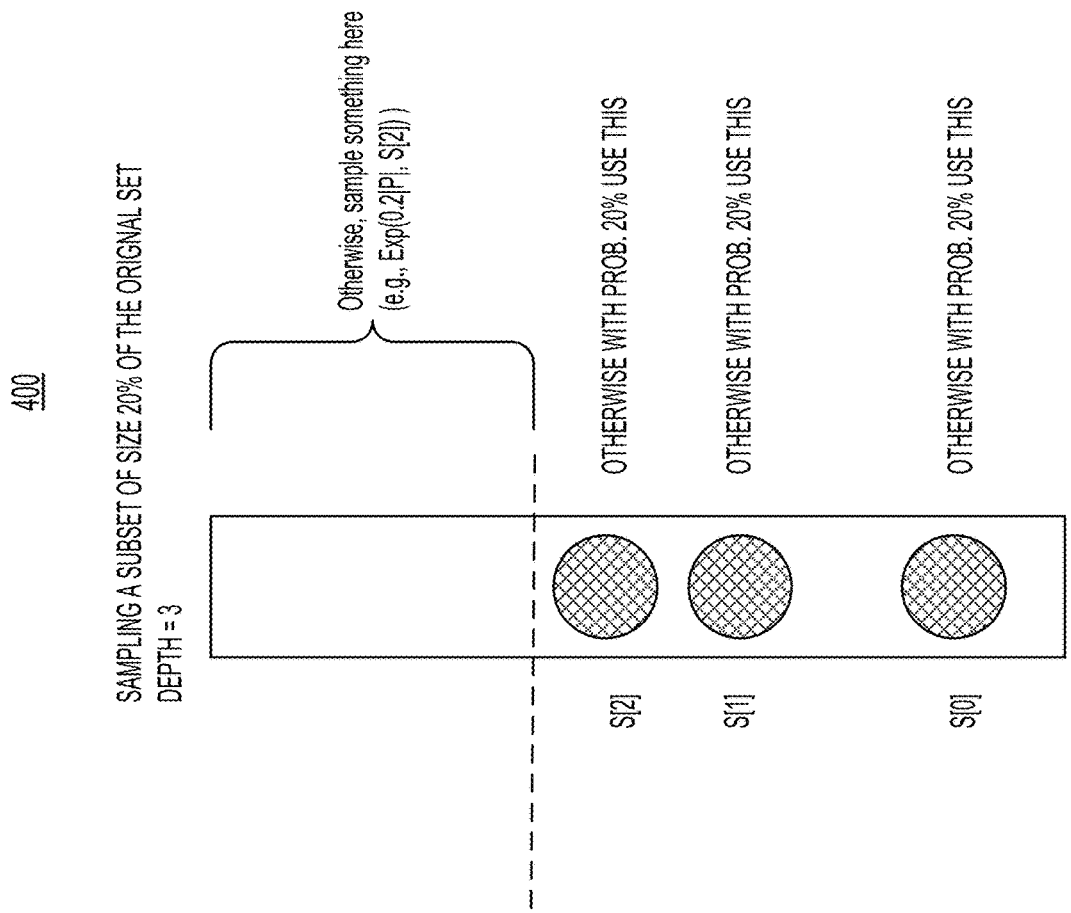
FIG. 4 illustrates a block diagram of an example subset sampling of a set of virtual identifiers for sketch generation.

The panelist mapper 140 can also perform deep sketch subsampling, as described herein. Referring briefly now to FIG. 4, depicted is an example diagram 400 of the panelist mapper 140 can perform deep sketch subsampling to generate one or more registers of a sketch, such as a HLL sketch, for a panelist. To perform deep sketch subsampling, the sketch generator 145 can first generate a deep sketch representing all of the VIDs. As the VIDs are generally not updated frequently, this process does not need to be performed every time, and thus the sketch can be maintained by the data processing system and updated as-needed by the sketch generator 145 when new VIDs 175 are added or generated. Deep sketch subsampling can quickly sample a random subset of a pool of VIDs 175 (e.g., those that are used to generate the deep sketch, etc.) without analyzing all of the VIDs 175 in the pool. The goal is to partition the pool of VIDs 175 into disjoint subsets of VIDs that can each be allocated to a respective panelist identifier 165. As depicted in FIG. 4, the diagram 400 shows a subset of a pool of VIDs for an HLL register is sampled such that 20% of the original VIDs 175. The depth value can be 3 in this example, but it should be understood that any depth value can be utilized. However, the goal is to sample disjoint subsets to be allocated to the panelists 165, and thus performing deep sketch subsampling multiple times may not achieve that goal.

Figure 5:
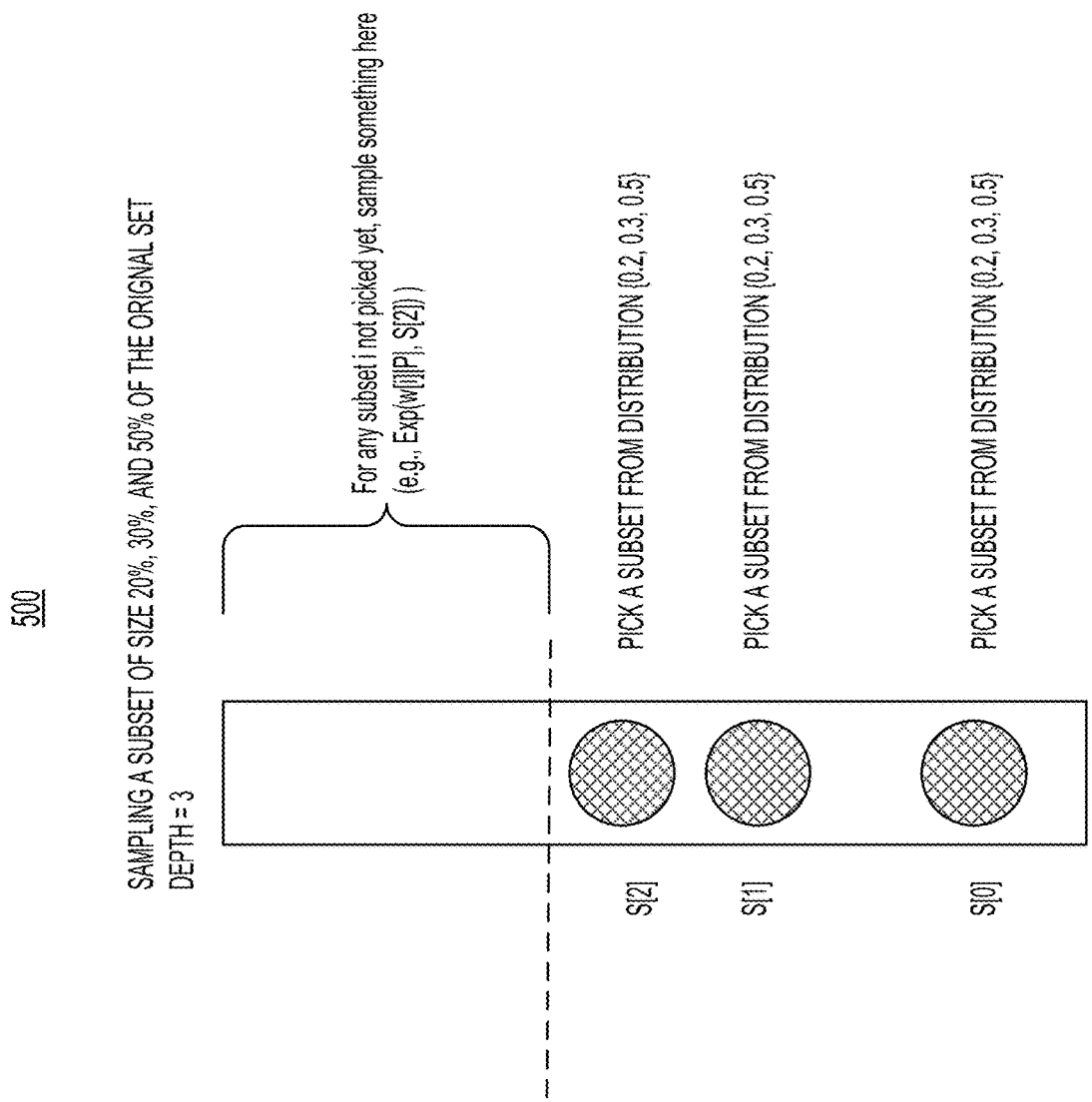
FIG. 5 illustrates a block diagram of an example subset sampling of a set of virtual identifiers for sketch generation using weight values.

Referring briefly now to FIG. 5, depicted is an example diagram 500. The panelist mapper 140 can utilize a similar approach to sample disjoint subsets of the VIDs 175 that can then be assigned to a corresponding panelist 165. As depicted in the diagram 400, three disjoint subsets of size 20%, 30% and 50% of the set of VIDs can be sampled by the panelist mapper 140 (e.g., for each register in an HLL sketch, etc.). The panelist mapper 140 can perform the sampling using the following algorithm:

```
input: Q panelists identifiers 165 with weights $w_1, w_2, \ldots, w_q$ that sum up to 1. A sketch
    with depth D: $S_1 \le S_2 \le \ldots \le S_D$ corresponding to pool P.
    output: random disjoint sketches $r_1, r_2, \ldots, r_Q$.
Algorithm 1
for $1 \le j \le Q$, let $r_j$ be an empty sketch of panelist j
For each d in D .. 1:
    Sample a panelist j based on $w_1, w_2, \ldots, w_Q$, and let $r_j$ be $S_d$
for each panelist j
    if $r_j$ is empty, sample it from $Exp(|P|w_j, S_D)$
```

Algorithm 1 above can be utilized to achieve the volume goal.

The proof of algorithm one follows. The proof below includes the result if D=1, but the proof for D>1 follows similarly. Since D=1, the depth index for S is dropped.

For each panelist j, $r_j$ is S with probability $w_j$, and $Exp(|P|w_j, S)$ otherwise. It suffices to show that for a subset of panelists with weights $w_1, w_2, \ldots w_Q$ where $1 < Q' < Q$, $$r_{Q'} \equiv \min_{1 \le q \le Q'} r_q$$

is S with probability $\Sigma_{q=1}^{Q'}$ and $Exp(|P|\Sigma_{q=1}^{Q'} w_q, S)$ otherwise.

Note that $r_{Q'}$ is S only if the sampled panelist based on $w_1, w_2, \ldots, w_Q$ lies within [1,Q'], which can happen with probability $\Sigma_{q=1}^{Q'} w_q$. Otherwise, $r_{Q'}$ is the minimum of independent $Exp(|P|w_q, S)$ for $1 \le q \le Q'$. By the nice property of exponential distribution, in this case $r_{Q'}$ can be sampled from $Exp(|P|\Sigma_{q=1}^{Q'} w_q, S)$.

When implementing the algorithm above, the panelist mapper 140 can sample from $Exp(|P|w_j, S_D)$. However, is may present issues. For example, when $|P|w_j \ll 1$ (e.g. a panelist could only expect 0.5 VID in a register, etc.), the panelist mapper 140 is likely to draw a sample of $Exp(|P|w_j, S_D)$ greater than 1, which will then make this register treated as empty by the current cardinality estimation. This may cause severe undercounting. The current HLL sketch may not sample from an exponential random variable, but rather from a uniform random variable. Although such variables can become identical with large cardinality, at low volume they can diverge. Adding an exponential random variable to a uniform could alter the distribution. Sampling from a fractional $|P|w_j \ll 1$ can also lead to overcounting at the same time, because a panelist may only have non-empty sketches in half of the registers while with fractional they can potentially have non-empty sketches in all registers.

With the reasoning above, Algorithm 1 can be modified to address these issues.

Figure 6:
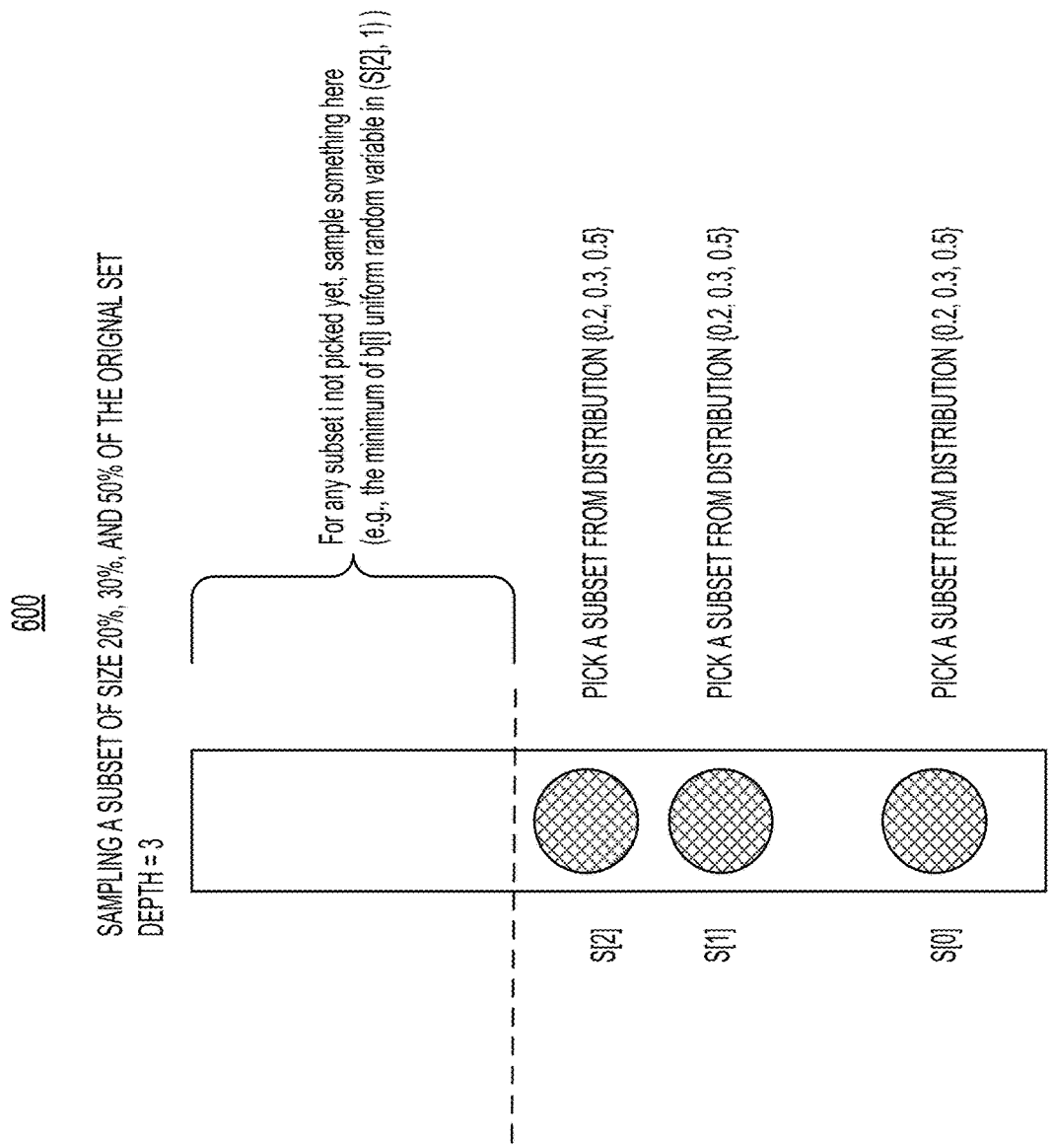
FIG. 6 illustrates a block diagram of an example modified subset sampling of a set of virtual identifiers for sketch generation.

Referring briefly now to FIG. 6, depicted is an example diagram 600 of sampling disjoint subsets of size 20%, 30%, and 50% of the original set with an example depth value of 3. However, as depicted in diagram 500, the panelist mapper 140 can select the disjoint subsets according to Algorithm 2, included below.

```
                            Algorithm 2 for $1 \le j \le Q$, let $r_j$ be an empty sketch of panelist j
For each d in D .. 1:
    Sample a panelist j based on $w_1, w_2, \ldots, w_Q$ and let $r_j$ be $S_d$
    Sample multinomial random variabies $b_1, b_2, \ldots, b_Q$ from $w_1, w_2, \ldots w_Q$ that sum up to $|P| - D$
    for each panelist j
        if $r_j$ is empty:
            if $b_j > 0$:
                Sample x, the minimum of $b_j$ uniform random variabies from (0, 1)
                let $r_j$ be $S_D + (1 - S_D)x$
```

Experimental data including resulting performance of an example implementation that utilizes Algorithm 2 is described herein below in conjunction with FIGS. 10A-15B.

Figure 7:
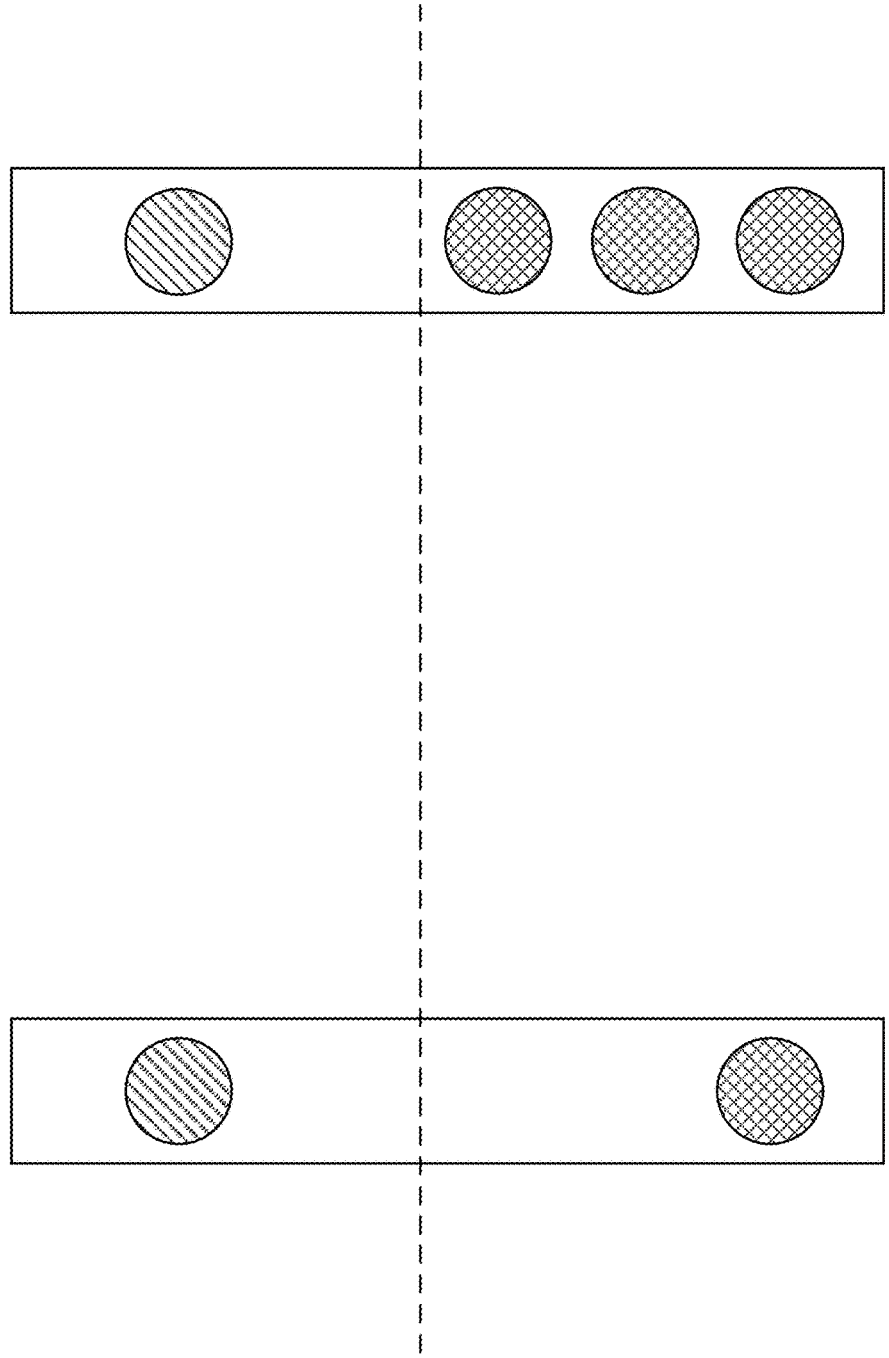
FIG. 7 illustrates a block diagram of an example depth selection for subset sample of sets of virtual identifiers.

To achieve the interaction goal, the panelist mapper 140 can determine an appropriate depth value for the algorithms described herein above. To describe the solution to this issue, the focus is on a single register, which can store the D smallest uniform random samples $S_1, S_2, \ldots, S_D$ out of |P|. Referring briefly now to FIG. 7, depicted is an example diagram 700 of a merge of a normal subset and another independent subset sampled with a depth value of 3. Consider a random subset $P_1$ of P (e.g., a pool of VIDs 175, etc.) with size $p_1|P|$, representing the an online content audience. Let the sketch of $P_1$ be $r_1$, generated using production system, (e.g., $r_1$ is the smallest of a random subset of |P| samples.

Consider another independent random subset $P_2$ of P with size $p_2|P|$, representing an offline content audience. Let the sketch of $S_2$ be $r_2$, a union generated by our proposal, e.g., with probability $p_2$ it is equal to $S_1$, otherwise with probability $p_2$ it is equal to $S_2$, etc. If $r_2$ is none of $S_1, S_2, \ldots, S_D$, then it is sampled uniformly at random from $[S_D, 1]$. The true expected size of $P_1 \cup P_2$ is $(p_1+p_2-p_1p_2)|P|$.

With ideal sketch, the expected size of implemented $P1 \cup P2$ above is bounded by: $|P|((1-p_1)^D(1-p_2)^D(p_1+p_2+(1-(1-p_1)^D(1-p_2)^D(p_1+p_2-p_1p_2))$ from above.

Proof

The sketch of the union is $r=\min(r_1,r_2)$. With probability $(1-p_1)^D(1-p_2)^D$, neither sketch is equal to any of $S_1, S_2, \ldots, S_D$. Otherwise r is an ideal sketch and results in true expected union size.

When neither sketch is equal to any of $S_1, S_1, \ldots, S_D$, r is the minimum of $|P|(p_1+p_2)$ independent sketches on top of $S_D$.

Q.E.D.

Assuming the ideal sketch, for the union described above the relative error $$\frac{\text{true union size} - \text{estimated union size}}{\text{estimated union size}}$$

is bounded by $$\frac{(2D)^{2D}}{2(2D+1)^{2D+1}}$$

from above.

Proof

The relative error defined above is $$f(p_1, p_2) = (1-p_1)^D (1-p_2)^D \frac{p_1 p_2}{p_1 + p_2}.$$

When $p_1+p_2$ is fixed, it is maximized when $p_1=p_2$, so we reduce it to $$f(p) = (1-p)^{2D} \frac{p^2}{2p} =$$

-continued $$\frac{1}{2}p(1-p)^{2D} = \frac{1}{2}(2D)^{2D} p\left(\frac{1-p}{2D}\right)^{2D} \leq \frac{1}{2}(2D)^{2D} \frac{1}{(2D+1)^{2D+1}}$$

Q.E.D.

Note that the upper bound can be loose, since equality holds when $$p_1 = p_2 = \frac{1}{2D+1}.$$

The various upper bounds are evaluated below in Table 1 for D. Experimental data is described herein below in conjunction with FIGS. 14A and 14B.

TABLE 1

| Depth | Error bound |
| --- | --- |
| 1 | 7.41E−02 |
| 2 | 4.10E−02 |
| 5 | 1.75E−02 |
| 6 | 1.47E−02 |
| 7 | 1.27E−02 |
| 8 | 1.11E−02 |
| 9 | 9.94E−03 |
| 10 | 8.97E−03 |
| 11 | 8.18E−03 |
| 12 | 7.51E−03 |
| 13 | 6.94E−03 |
| 14 | 6.45E−03 |
| 15 | 6.03E−03 |
| 20 | 4.54E−03 |
| 50 | 1.83E−03 |

Referring back now to FIG. 1, the sketch generator 145 can reduce, for each of the identified subset of panelist identifiers 165, the associated VIDs 175 to a sketch that represents the VIDs 175 that are associated with a respective panelist identifier. Thus, the sketch generator 145 can generate a sketch for each of the panelists 165 that are identified as part of the subset of panelists by the panelist identifier module 135. A sketch can be a probabilistic data structure that represents the VIDs in a compact way. The sketch can be, for example, an HLL sketch. The sketch generator 145 can generate a sketch to include thousands of registers. For example, a HLL sketch can include 2 to the 14, or roughly 16K registers. However, other numbers of registers may be used. When a new VPID is to be included in a sketch (e.g., accessed from the mapping generated by the panelist mapper 140, etc.), it can be pseudo randomly directed to one of the 16K registers. Each register can be either empty or can holds a register sketch, which can be a number between 0 and 1. Within a register, the sketch generator 145 can hash each VPID can be hashed to a uniform pseudo random variable between 0 and 1. If the hashed value is smaller than the existing register sketch, the latter can be updated to be equal to the former. In other words, if a register has processed R unique VPIDs, then it holds the minimum of R corresponding uniform random variables. Mathematics says this minimum has distribution close to exponential random variable with rate R, so it could later provide an approximate unique count of the number of VPIDs that contributed to the register. The sketch generator 145 can store and update the registers of each HLL sketch in the memory of the data processing system 105. After or during sketch generation, the panelist mapper 140 can perform the deep sketch sub-sampling described herein above to improve computation time.

Figure 3:
FIG. 3 illustrates a block diagram of an example representation of example sketch registers generated using virtual identifiers.
Figure 3:
Figure 3:
Figure 3:
Figure 3:

Referring briefly now to FIG. 3, depicted is a diagram 300 showing an example representation of VIDs that are mapped to respective registers. As shown in the diagram, each VID is assigned to only one register (e.g., a VID cannot be assigned to more than one register, etc.). The register values (e.g., the minimum value R of any register) of all registers can be used to estimate the cardinality (e.g., number of unique values, etc.) of the VIDs that contributed to the HLL sketch.

Referring back now to FIG. 1, the sketch combiner 150 can combine the sketch of each of the subset of panelist identifiers into an aggregated sketch. HLL sketches that are generated using a similar seed (e.g., a hashing function, etc.) can be merged together using an HLL merging algorithm. The resulting aggregated sketch can represent all of the VIDs represented by all of the panelists 165 in the subset of panelists 165 identified by the panelist identifier module 135. To merge the sketches, the sketch combiner 150 can iterate through each register in all of the sketches (e.g., select register position zero from all sketches to be merged, perform the merge on the selected register, then select register one from all sketches, perform the merge on the selected register, and so on, etc.). To generate an aggregated sketch, the sketch combiner can identify the maximum register value across all HLL sketches to be merged for a particular merge position, and select that value for that position in the aggregated sketch. For example, if three sketches are being merged, and at register position 81, the three sketches have the respective values 8, 100, and 904, the aggregated sketch can have the value of 904 at register position 81. The sketch combiner 150 can repeat this process for all of the registers positions across the sketches. The resulting aggregated sketch can be stored in one or more data structures in the memory of the data processing system 105.

The sketch transmitter 155 can transmit the aggregated sketch to a computing device for analysis with an aggregated sketch representing online content events. Online content events can have a sketch that is generated using the same seed, and thus can be combined with the sketch generated by the sketch combiner 150 for a complete analysis of virtual identifiers that access both online and offline content. The sketch transmitter 155 can access the memory of the data processing system 105 to retrieve the aggregated sketch, and transmit the sketch in one or more messages to another computing device for further processing. In some implementations, the sketch can be transmitted to the computing device that requested the sketch, and specified target content for use in identifying the subset of panelists 165. The sketch transmitter 155 can transmit the sketch as a response to the request for a sketch representation, and can include a list of the panelist identifiers 165 that were identified as part of the subset. In some implementations, the list of panelist identifiers are not included with the aggregated sketch, and instead the aggregated sketch is transmitted on its own.

Figure 8:
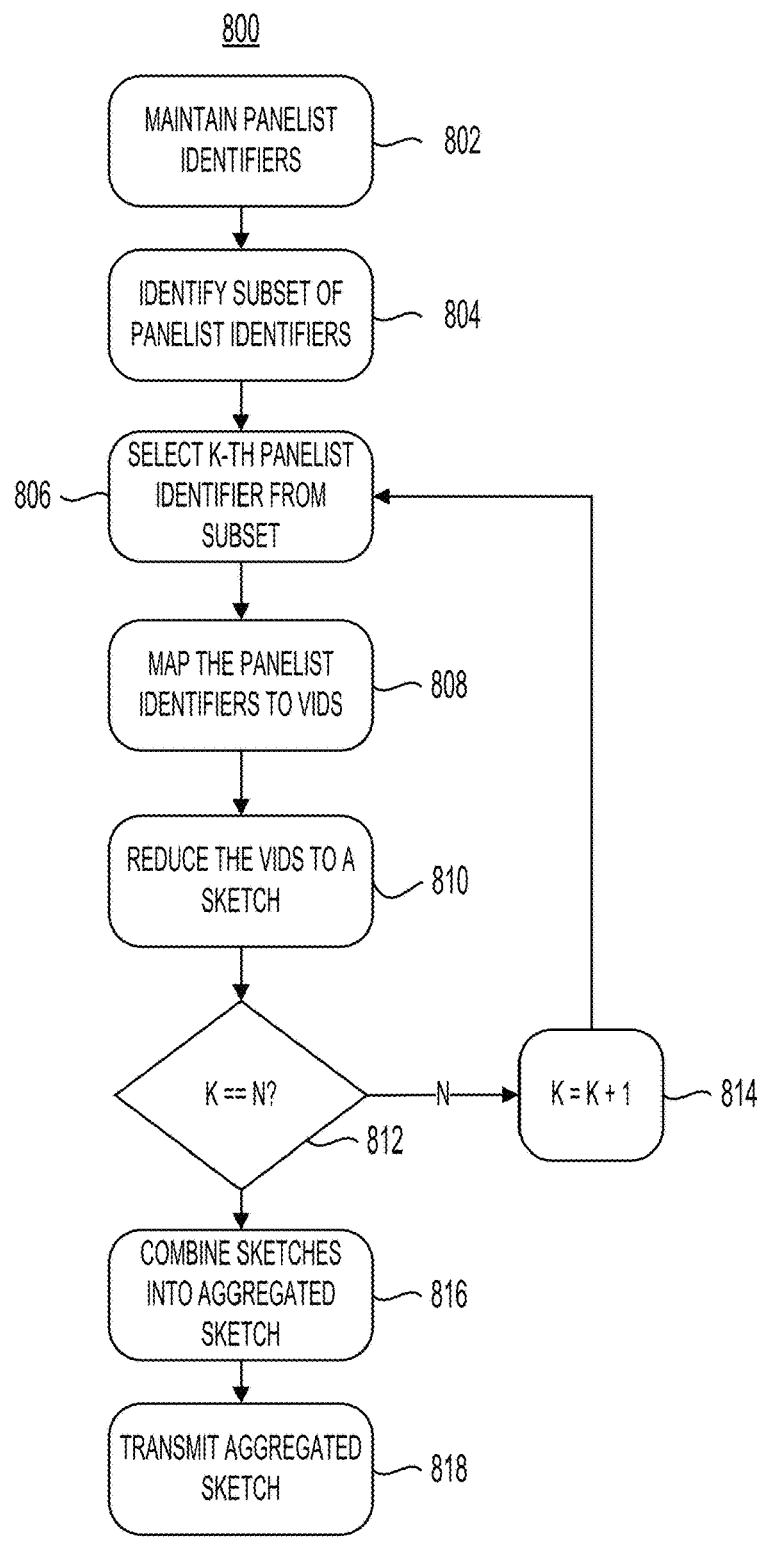
FIG. 8 illustrates an example flow diagram of a method for cross media reporting by fast merging of panelist activity.

Referring now to FIG. 8, depicted is an illustrative flow diagram of a method 800 for cross media reporting by fast merging of panelist activity. The method 800 can be executed, performed, or otherwise carried out by the data processing system 105, the computer system 900 described herein in conjunction with FIG. 9, or any other computing devices described herein. In brief overview of the method 800, the data processing system (e.g., the data processing system 105, etc.) can maintain panelist identifiers (STEP 802), identify a subset of panelist identifiers (STEP 804), select the k-th panelist identifier from the subset (STEP 806), map the panelist identifiers to VIDs (STEP 808), reduce the VIDs to a sketch (STEP 810), determine whether the counter register k is equal to the number of panelists n (STEP 812), increment the counter register k (STEP 814), combine the sketches into an aggregated sketch (STEP 816), and transmit the aggregated sketch (STEP 818).

In further detail, the data processing system can maintain panelist identifiers (STEP 802). The data processing system can maintain, the panelist identifiers (e.g., the panelist identifiers 165 stored in association with a respective one or more offline content events. For example, the data processing system can receive the messages describing offline content events from the panelist devices (e.g., the panelist devices 120, etc.), and can match the offline content event contained in the message to a particular panelist identifier 165. The panelist identifier 165 can be included in the message that reports the offline content event. The data processing system can store any or all information about the offline content event (including type of event, or any other offline content event information described herein, etc.) in association with an identifier of the offline content item that was subject to the offline content event, and the panelist identifier 165 that reported the offline content event. These associations can be stored in one or more data structures in the memory of the data processing system or in a database (e.g., the database 115, etc.).

The data processing system can identify a subset of the panelist identifiers (STEP 804). The data processing system can identify a subset of panelist identifiers that are associated with a particular offline content event. In some implementations, the data processing system can a request for a sketch that represents the virtual audience of an item of offline content. In response to the request, the data processing system can identify, from the panelist identifiers 165, a subset of panelist identifiers that are stored with a respective offline content event that matches a target offline content event specified in the request. To do so, the data processing system can iterate through each of the panelist identifiers 165 to identify which of the panelist identifiers are associated with the event (e.g., matching any target offline content during a specified time period, etc.). In some implementations, the data processing system can construct a list or another type of data structure that includes the identified subset of the panelist identifiers 165 that meet the criteria identified in the request for the sketch.

The data processing system can select the k-th panelist identifier from the subset of panelist identifiers (STEP 806). To generate a sketch for each panelist in the subset that represents the VIDs mapped to the respective panelist, the data processing system can iteratively loop through each of the subset of panelists based on a counter register k. Each of the subset of the panelists can be stored and indexed in a data structure by an index value (e.g., index 0, index 1, index 2, etc.). To generate a sketch for each panelist, the data processing system can select the panelist of the subset that is stored in association with an index value equal to the counter register k. If it is the first iteration of the loop, the counter register k may be initialized to an initialization value (e.g. k=0) before selecting the k-th classifier. Accessing the panelists can include copying the data associated with the selected panelist to a different region of computer memory, for example a working region of memory in the data processing system.

The data processing system can map the selected panelist identifier to one or more corresponding VIDs (STEP 808). The data processing system can associate VIDs 175 to panelist identifiers 165 (sometimes referred to herein as "panelist(s)") of the subset based on the weight of each panelist and pool size of VIDs. If the weight is determined by a day-by-day basis, or if the weight is determined for a date range, a panelist p with weight $w_p$ can be associated with $$\frac{p_{w_p}}{\Sigma_{p \in P} w_p}$$

VIDs 175 in the pool, where P can be the pool size. To reduce the shuffling in association caused by weight change, weight consistent hashing (sometimes referred to as "affinity hashing") can be used to pick the associated $$\frac{p_{w_p}}{\Sigma_{p \in P} w_p}$$

VIDs. This can work in the reverse direction. For each VID, the probability they're picked by panelist p can be $$\frac{\Sigma_{p \in P} w_p}{w_p}.$$

Each panelist identifier 165 can be assigned to one or more virtual identifiers 175, and each virtual identifier 175 can be assigned to one panelist identifier 165. In some implementations, the VIDs 175 to which the panelists 165 are mapped can be determined by identifying matches between the respective panelist attributes 170 and the virtual attributes 180.

The data processing system can generate the mapping of the panelist identifiers to the VIDs 175 based on matching attribute data. For example, the data processing system can compare attribute data of the panelist identifiers 165 to the virtual attributes 180, and assign a mapping to corresponding VIDs 175 that have matching attribute data. This can be performed in accordance with the weight values, such that the number of VIDs 175 associated with any given panelist are proportional to the weight value of that panelist. The data processing system can store the results of this mapping as an adjacency list, a graph matrix data structure, or any other type of data structure, in the memory of the data processing system or the database (e.g., the database 115, etc.). The data processing system can also perform deep sketch subsampling as described herein.

The data processing system can reduce the VIDs to a sketch that represents the VIDs (STEP 810). The data processing system can reduce, for each of the identified subset of panelist identifiers 165, the associated VIDs 175 to a sketch that represents the VIDs 175 that are associated with a respective panelist identifier. Thus, the data processing system can generate a sketch for each of the panelists 165 that are identified as part of the subset of panelists by the data processing system. A sketch can be a probabilistic data structure that represents the VIDs in a compact way. The sketch can be, for example, an HLL sketch. The data processing system can generate a sketch to include thousands of registers. For example, a HLL sketch can include 2 to the 14, or roughly 16K registers. However, other numbers of registers may be used. When a new VPID is to be included in a sketch (e.g., accessed from the mapping generated by the panelist mapper 140, etc.), it can be pseudo randomly directed to one of the 16K registers. Each register can be either empty or can holds a register sketch, which can be a number between 0 and 1. Within a register, the data processing system can hash each VPID can be hashed to a uniform pseudo random variable between 0 and 1. If the hashed value is smaller than the existing register sketch, the latter can be updated to be equal to the former. In other words, if a register has processed R unique VPIDs, then it holds the minimum of R corresponding uniform random variables. Mathematics says this minimum has distribution close to exponential random variable with rate R, so it could later provide an approximate unique count of the number of VPIDs that contributed to the register. The data processing system can store and update the registers of each HLL sketch in the memory of the data processing system. After or during sketch generation, the data processing system can perform the deep sketch subsampling described herein above to improve computation time.

The data processing system can determine whether the counter register k is equal to the number of panelists in the subset n (STEP 812). To determine whether the data processing system has generated sketch for each of the panelists in the subset, the data processing system can compare the counter register used to select each panelist in the subset to the total number of panelists in the subset n. If the counter register k is not equal to (e.g., less than) the total number of panelists in the subset n, the data processing system can execute (STEP 814). If the counter register k is equal to (e.g., equal to or greater than) the total number of panelists in the subset n, the data processing system can execute (ACT 816).

The data processing system can increment the counter register k (STEP 818). To generate a sketch for each panelist in the subset, the data processing system can add one to the counter register k to indicate the number of panelists in the subset that have been used to generate a sketch. In some implementations, the data processing system can set the counter register k to a memory address value (e.g., location in computer memory) of the next location in memory of the next panelist in the subset, for example in a data structure. If this is the first iteration of this loop, the data processing system can initialize the counter register k to an initial value, for example zero, before incrementing the counter register. After incrementing the value of the counter register k, the data processing system can execute (STEP 806) of the method 800.

The data processing system can combine the sketch of each of the subset of panelist identifiers into an aggregated sketch (STEP 816). The data processing system can combine the sketch of each of the subset of panelist identifiers into an aggregated sketch. HLL sketches that are generated using a similar or identical seed (e.g., a hashing function, etc.) can be merged together using an HLL merging algorithm. The resulting aggregated sketch can represent all of the VIDs represented by all of the panelists 165 in the subset of panelists 165 identified by the data processing system. To merge the sketches, the data processing system can iterate through each register in all of the sketches (e.g., select register position zero from all sketches to be merged, perform the merge on the selected register, then select register one from all sketches, perform the merge on the selected register, and so on, etc.). To generate an aggregated sketch, the sketch combiner can identify the maximum register value across all HLL sketches to be merged for a particular merge position, and select that value for that position in the aggregated sketch. For example, if three sketches are being merged, and at register position 81, the three sketches have the respective values 8, 100, and 904, the aggregated sketch can have the value of 904 at register position 81. The data processing system can repeat this process for all of the registers positions across the sketches. The resulting aggregated sketch can be stored in one or more data structures in the memory of the data processing system or a database (e.g., the database 115, etc.).

The data processing system can transmit the aggregated sketch to a computing device (STEP 818). The data processing system can transmit the aggregated sketch to a computing device for analysis with an aggregated sketch representing online content events. Online content events can have a sketch that is generated using the same seed, and thus can be combined with the sketch generated by the data processing system for a complete analysis of virtual identifiers that access both online and offline content. The data processing system can access the memory of the data processing system to retrieve the aggregated sketch, and transmit the sketch in one or more messages to another computing device for further processing. In some implementations, the sketch can be transmitted to the computing device that requested the sketch, and specified target content for use in identifying the subset of panelists 165. The data processing system can transmit the sketch as a response to the request for a sketch representation, and can include a list of the panelist identifiers 165 that were identified as part of the subset. In some implementations, the list of panelist identifiers are not included with the aggregated sketch, and instead the aggregated sketch is transmitted on its own.

Figure 9:
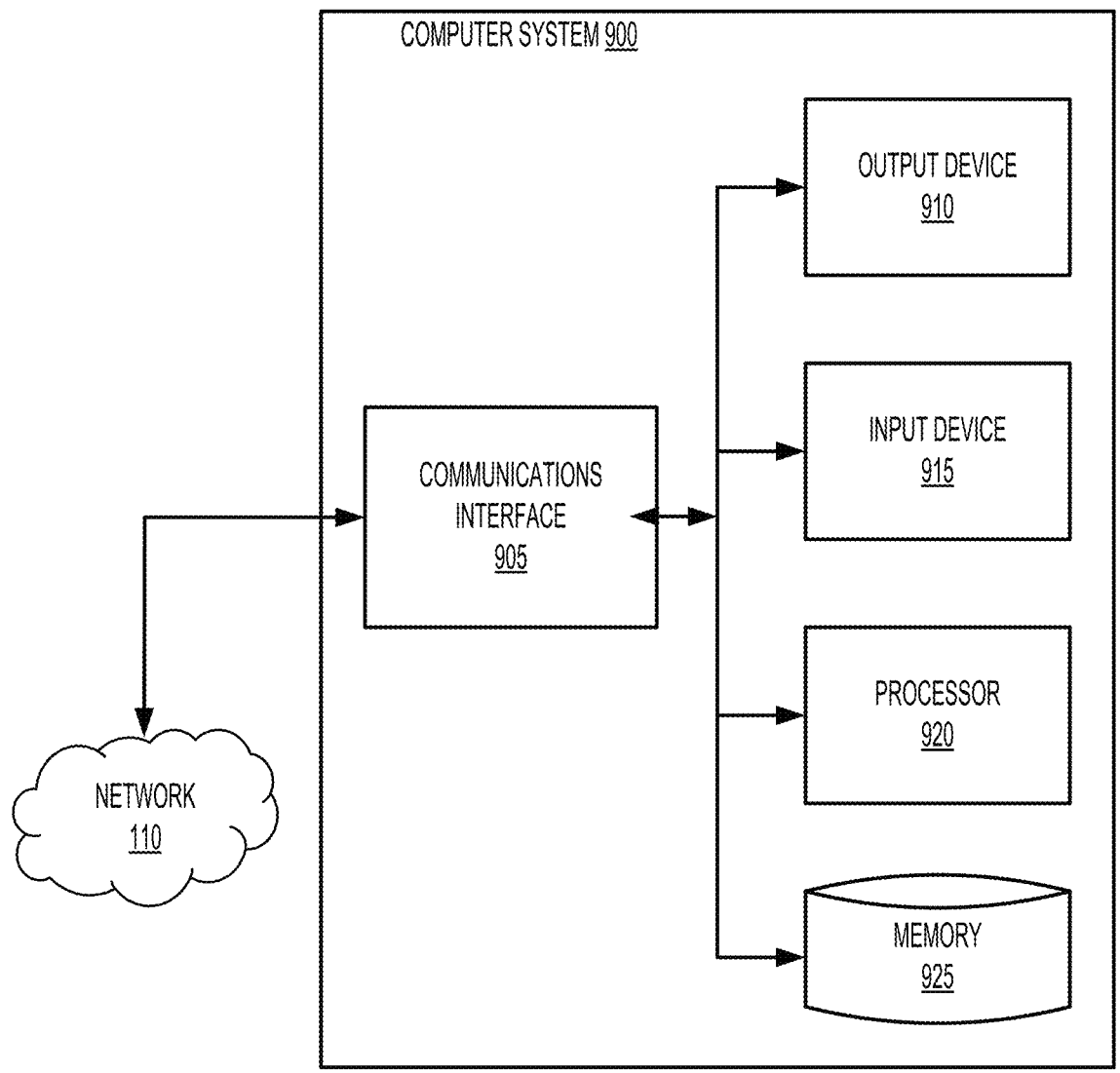
FIG. 9 illustrates the general architecture of an illustrative computer system that may be employed to implement any of the computers discussed herein.

FIG. 9 shows the general architecture of an illustrative computer system 900 that may be employed to implement any of the computer systems discussed herein in accordance with some implementations. The computer system 900 can be used to provide information via the network 110 for display. The computer system 900 of FIG. 9 comprises one or more processors 920 communicatively coupled to memory 925, one or more communications interfaces 905, and one or more output devices 910 (e.g., one or more display units) and one or more input devices 915. The processors 920 can be included in any of the computing device described herein.

In the computer system 900 of FIG. 9, the memory 925 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 900 of FIG. 9, the computer system 900 can include the memory 925 to store information any of the information, variables, vectors, data structures, or other computer-readable information described herein, among others. The processor(s) 920 shown in FIG. 9 may be used to execute instructions stored in the memory 925 and, in so doing, also may read from or write to the memory various information processed and or generated pursuant to execution of the instructions.

The processor 920 of the computer system 900 shown in FIG. 9 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). While not shown explicitly in the system of FIG. 9, one or more communications interfaces facilitate information flow between the components of the system 900. In some implementations, the communications interface(s) may be configured (e.g., via various hardware components or software components) to provide a website as an access portal to at least some aspects of the computer system 900. Examples of communications interfaces 905 include user interfaces (e.g., web pages), through which the user can communicate with the computer system 900.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Described below are various experimental results for random subset sampling.

Setup $M=2^{14} \approx 16K$ registers were used. We take a typical bucket with Q=130 panelists, each on average representing $M/2 \approx 8K$ VIDs, e.g. every panelist has only 0.5 VIDs per register. The total pool size across all registers is $QM/2 \approx 1M$. The actual panelist weights were generated randomly. Q−1 uniform random variables were sampled, and the length of the intervals were divided by these numbers as weights.

Results

In FIGS. 10A, 10B, 11A, 111B, 12A, 12B, 13A, and 13B, the true volume and error of the first subset, then union of the first two subsets, union of the first three subsets, etc. were plotted. So each line has Q points. X-axis: true volume of union of subset. Y-axis: absolute value of relative error simulated production cardinality estimation (e.g., 1=100%).

Figure 10B:
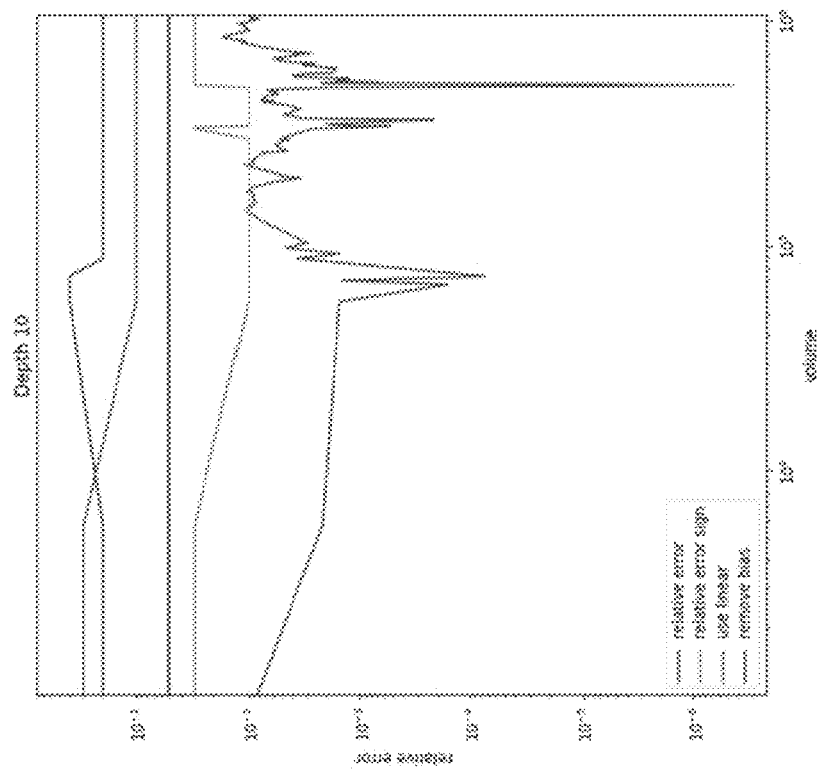
FIGS. 10A and 10B depict example experimental data from deep sketch subsampling of virtual identifiers at various depths.
Figure 10A:
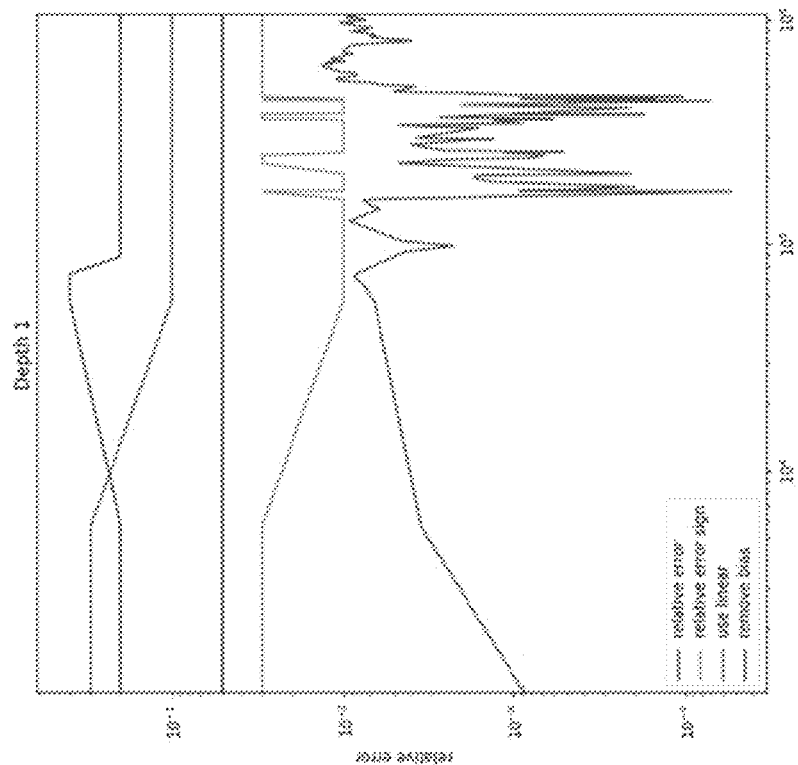

FIGS. 10A and 10B depict at most 1.5% error for Algorithm 2 with depth D=1 and D=10, on par with the original sketch. This can also justify Algorithm 1, another version of deep sketch subsampling.

Figure 11B:
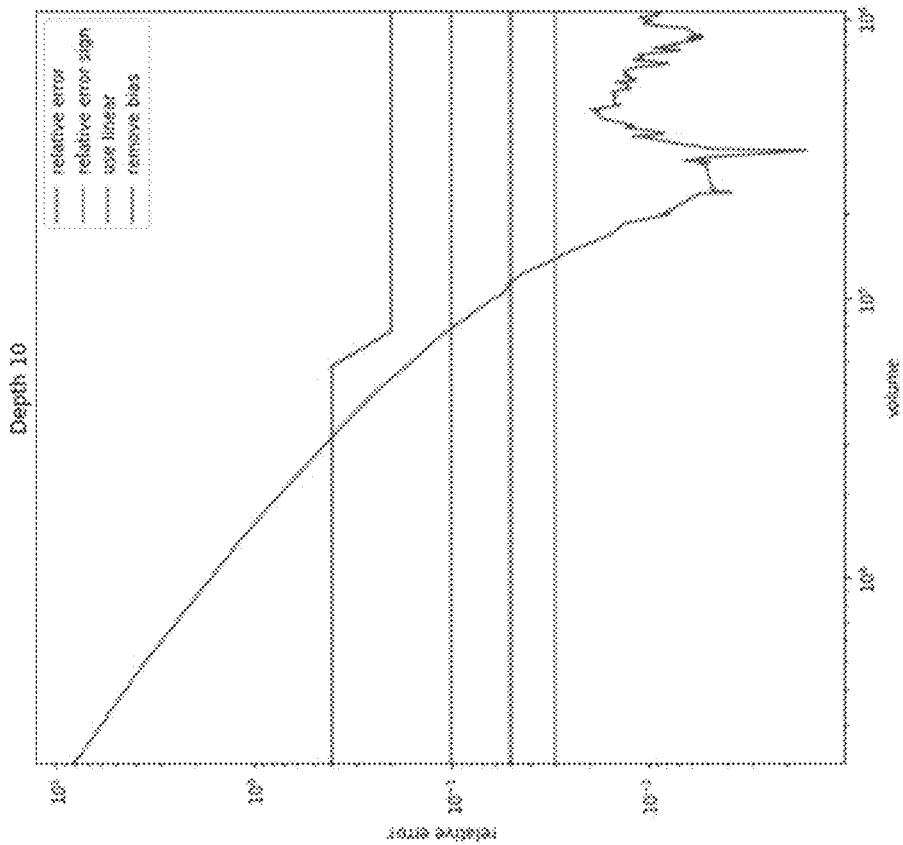
FIGS. 11A and 11B depict example experimental data from deep sketch subsampling using a fractional number of virtual identifiers.
Figure 11A:
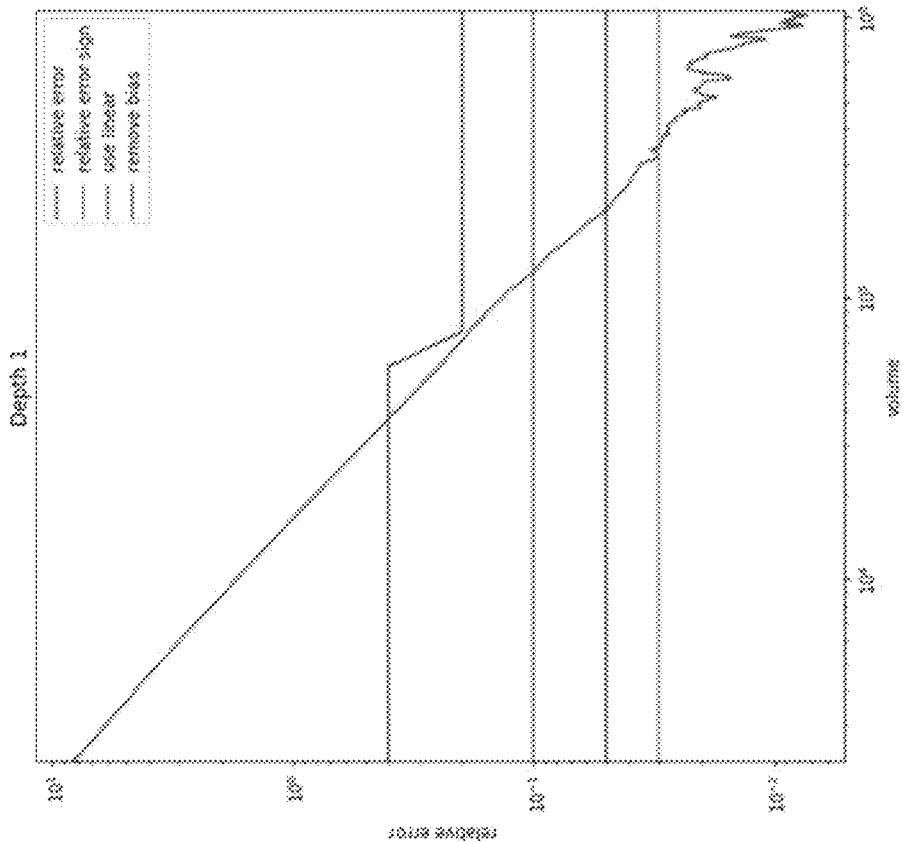

FIGS. 11A and 11B depict a fractional number of VIDs into the sampling formula, which can cause overcounting.

Figure 12B:
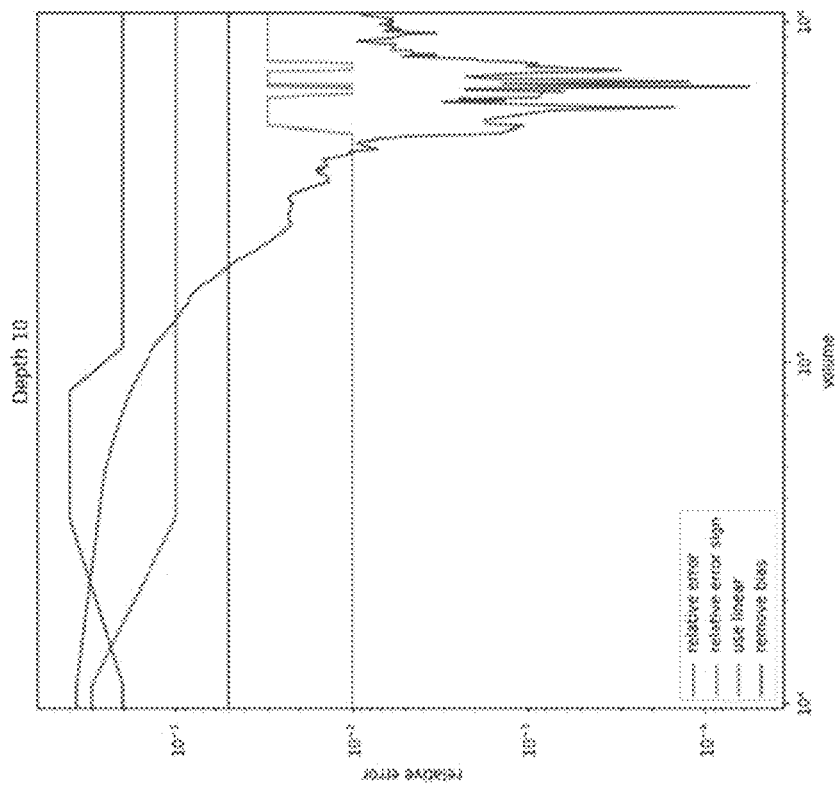
FIGS. 12A and 12B depict example experimental data from deep sketch subsampling of virtual identifiers using an exponential distribution.
Figure 12A:
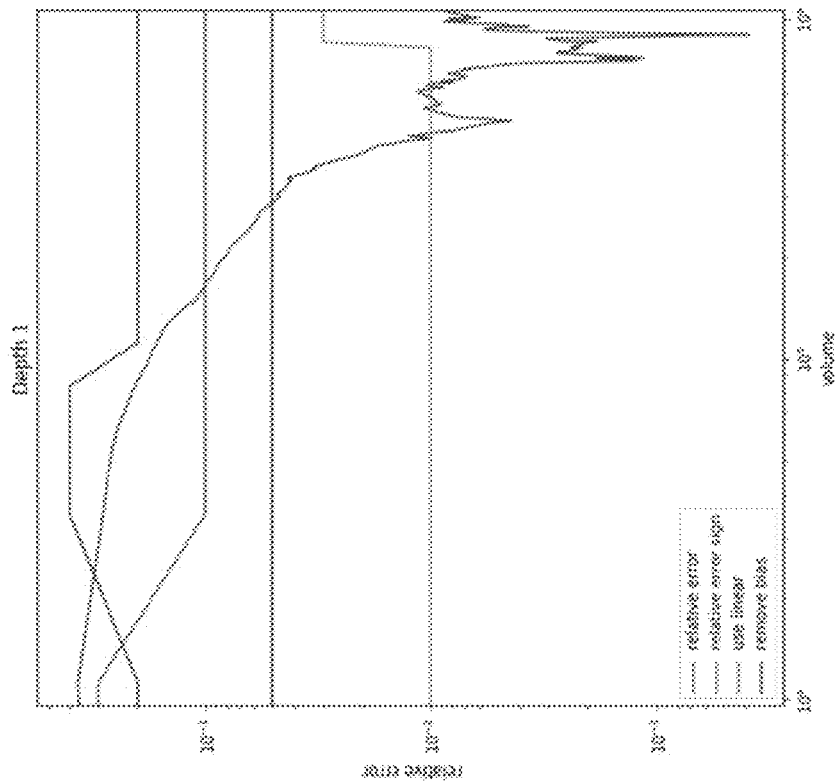

FIGS. 12A and 12B depict sampling of an exponential random variable on top of the uniform random variable of the sketch, with low cardinality the sum can easily exceed 1 and the register can be treated as empty (e.g., undercounting).

Figure 13B:
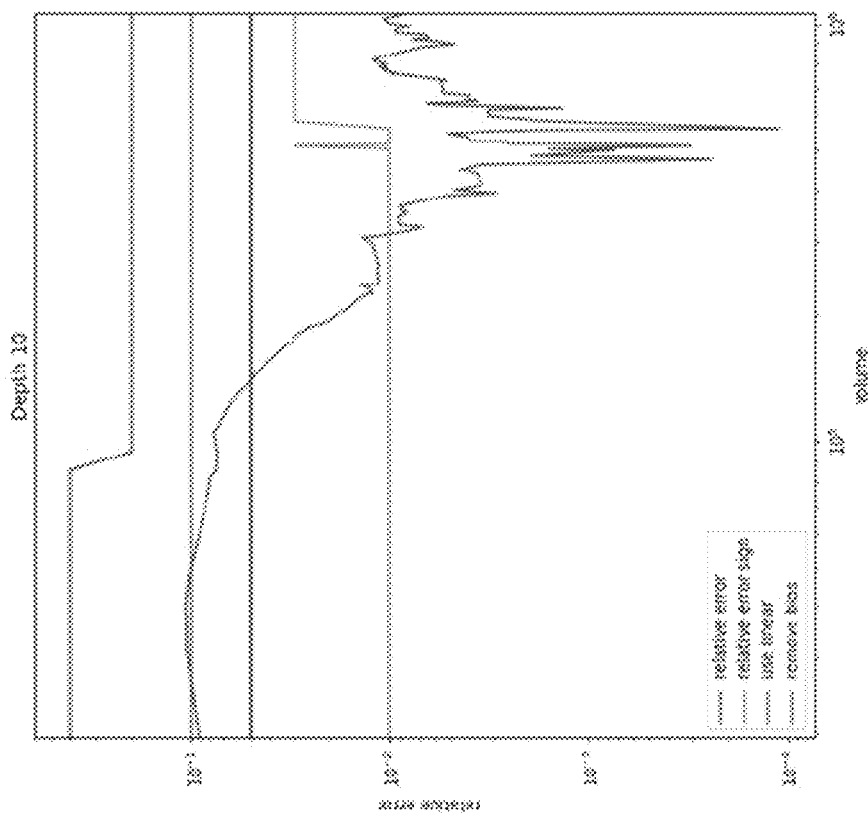
FIGS. 13A and 13B depict example experimental data from naïve deep sketch subsampling of virtual identifiers.
Figure 13A:
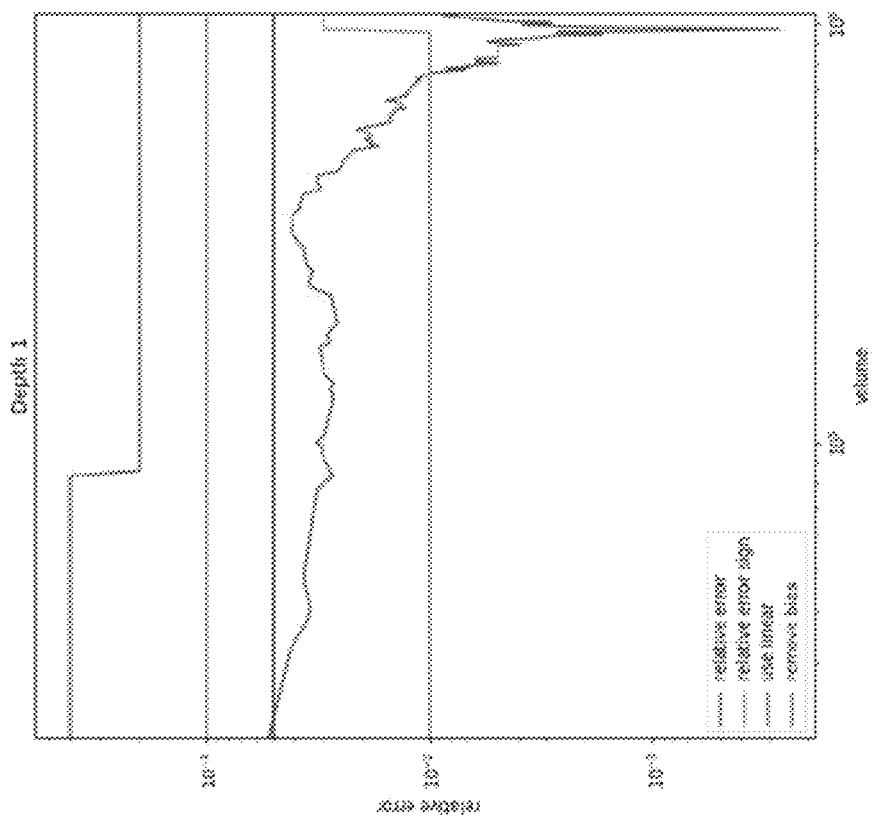

FIGS. 13A and 13B depict naïve sketch subsampling, to determine whether overcounting and undercounting cancel each other out. At D=1 it appears as though they do and achieve 5% error, but for D=10 undercounting appears to dominate.

Described below are various experimental results for the determination of an optimal depth value for sketch subsampling.

Setup

The setup for offline content events are the same as the setup above. For online content events, a random subset from the offline content events were sampled (e.g., to simulate overlapping online content events, etc.).

Results

An additional line is added, which corresponds to the derived upper bound on relative error $$(1-p1)^D(1-p2)^D \frac{p1p2}{p1+p2-p1p2}.$$

Figure 14A:
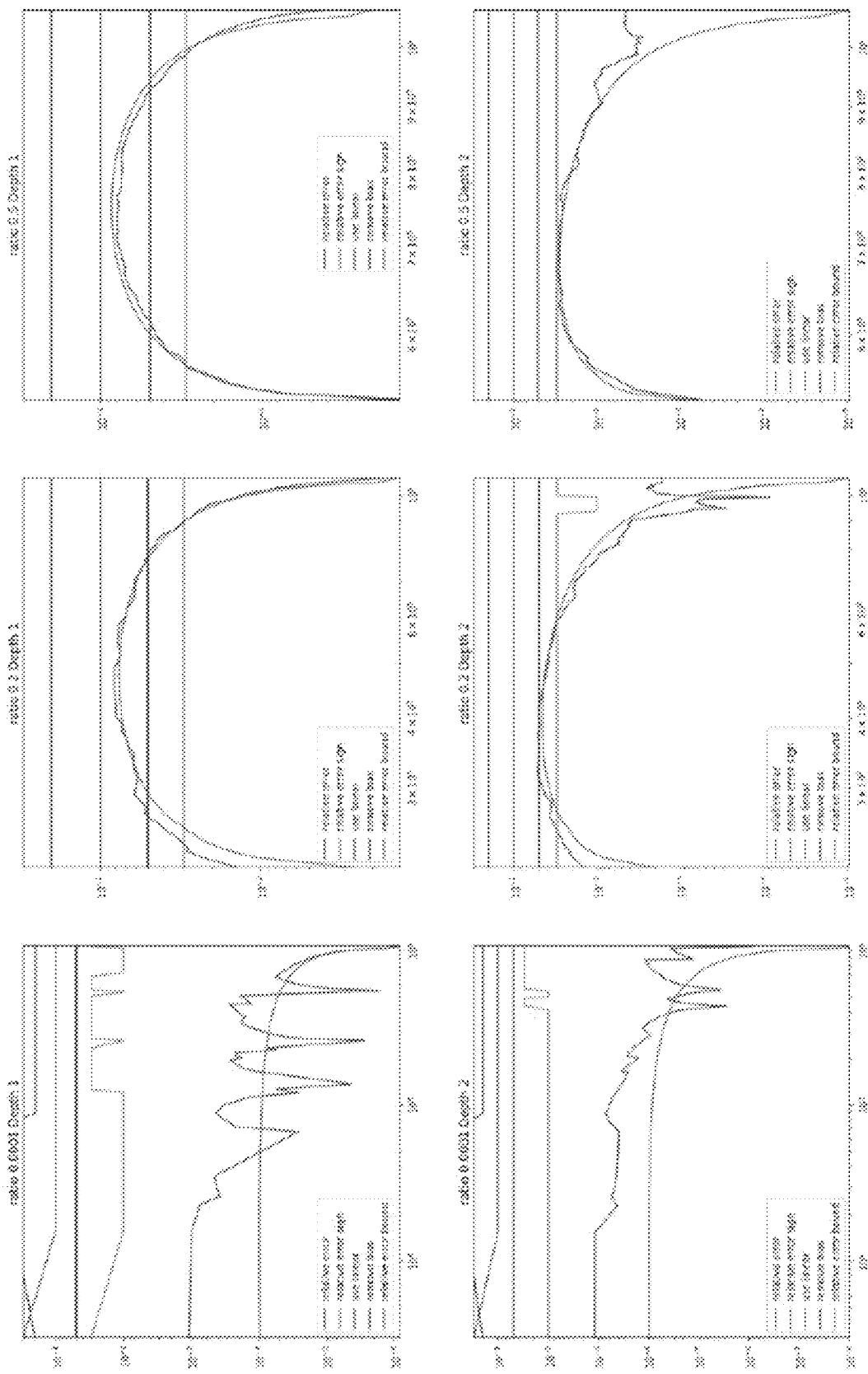
FIGS. 14A and 14B depict example experimental data from deep sketch subsampling of virtual identifiers at various depths merged with normal sketch of various numbers of virtual identifiers.
Figure 14B:
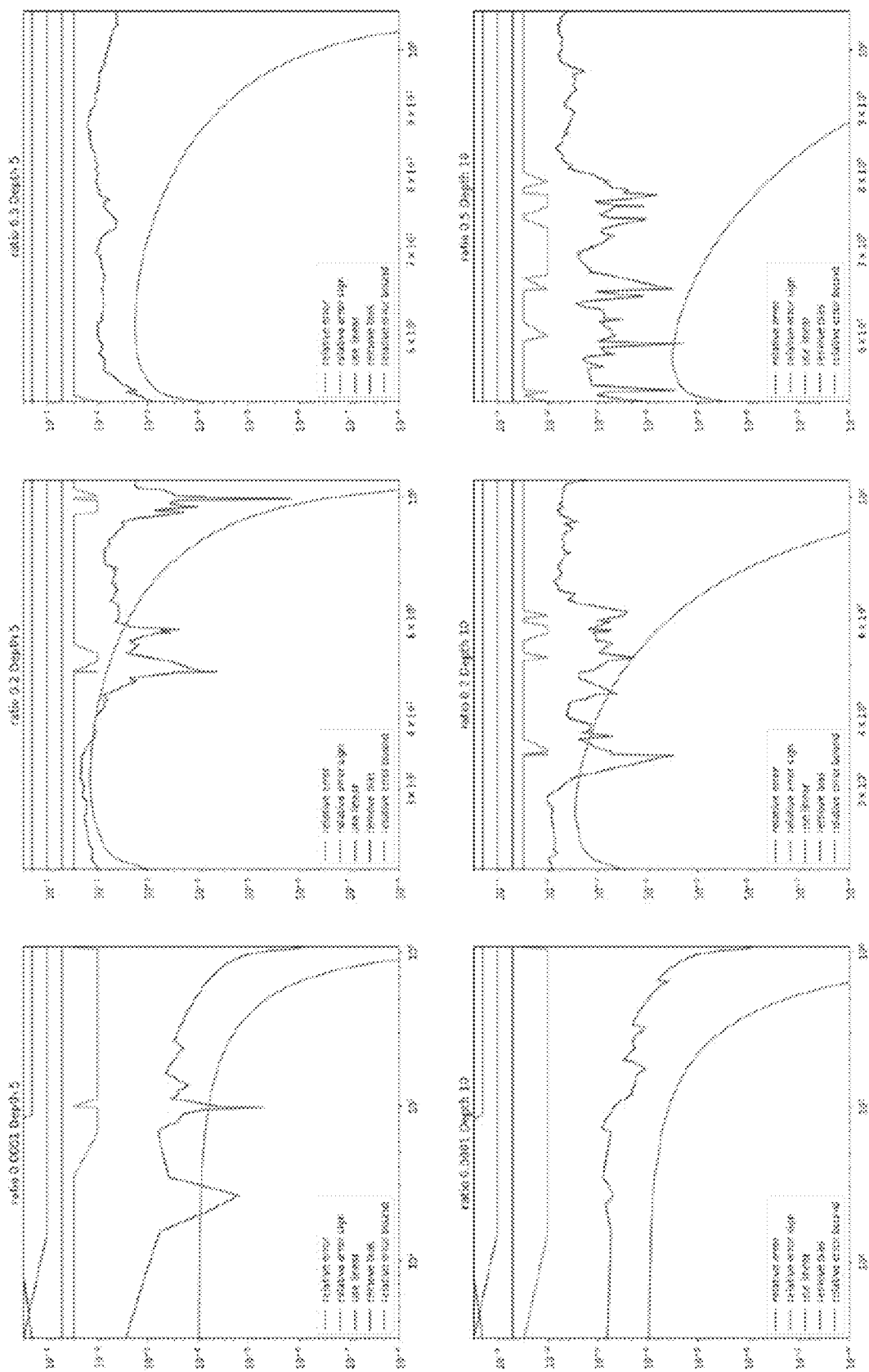

The ratio in the title for each graph depicted in FIGS. 14A and 14B indicates $p_1$, and the X-axis is $p_2|P|$.

As depicted in the drawings, the positive error sign indicated by the yellow line aligns with the introduced overcounting prediction, described herein above. Further, beyond the 1% level, the derived relative error bound indicated by the purple line matches the actual error (blue line) quite well. The suggested depth D=10 can have a relative error under 1%.

Described herein below are additional implementation details for deep sketch subsampling. One such implementation is a multinomial sampling implementation. The multinomial sampling implementation can be performed, for example, by any of the computing systems described herein, including the data processing system 105 (or the components thereof).

In a multinomial sampling implementation, to sample $b_1$, $b_2$, ..., $b_Q$ from multinomial distribution with $|P|$ trials (neglecting subtraction of depth) and probabilities to $w_1$, $w_2$, ..., $w_Q$ there are a few different implementations. Note that $|P|$ can be at least on the order of 600, and Q on the order of 2000. However, these are example values, and should not be construed as limiting on the claimed technology to any particular implementation.

In a $O(Q+|P|\log_2 Q)$ implementation, O(Q) can be used to build an array $w_1, w_1+w_2, w_1+w_2+w_3, \ldots$ and then for each trial, a uniform random sample u can be drawn. The first element in that array that is greater than or equal to u can be then be found. On advantage to this implementation is that the involved computation does not have potential numerical issues.

In a $O(Q+|P|)$ implementation, the same array ($w_1$, $w_1+w_2, w_1+w_2+w_3, \ldots$) can first be constructed. Next, the minimum value of $|P|$ independent uniform random values can be extracted using inverse transform sampling in an O(1) operation. A panelist can then be identified in $O(\log_2 Q)$ operations, then sample the minimum of the remaining uniform random values can be successively sampled to identify panelists with a linear scan. One advantage to this implementation is that it can complete in fewer operations.

In a pseudo-multinomial $O(|P|Q)$ operation, each VID and each panelist j can be associated with a probability $w_j$ regardless of whether the VID is associated with any other panelist. One advantage to this approach is that it is very easily parallelized.

Figure 15B:
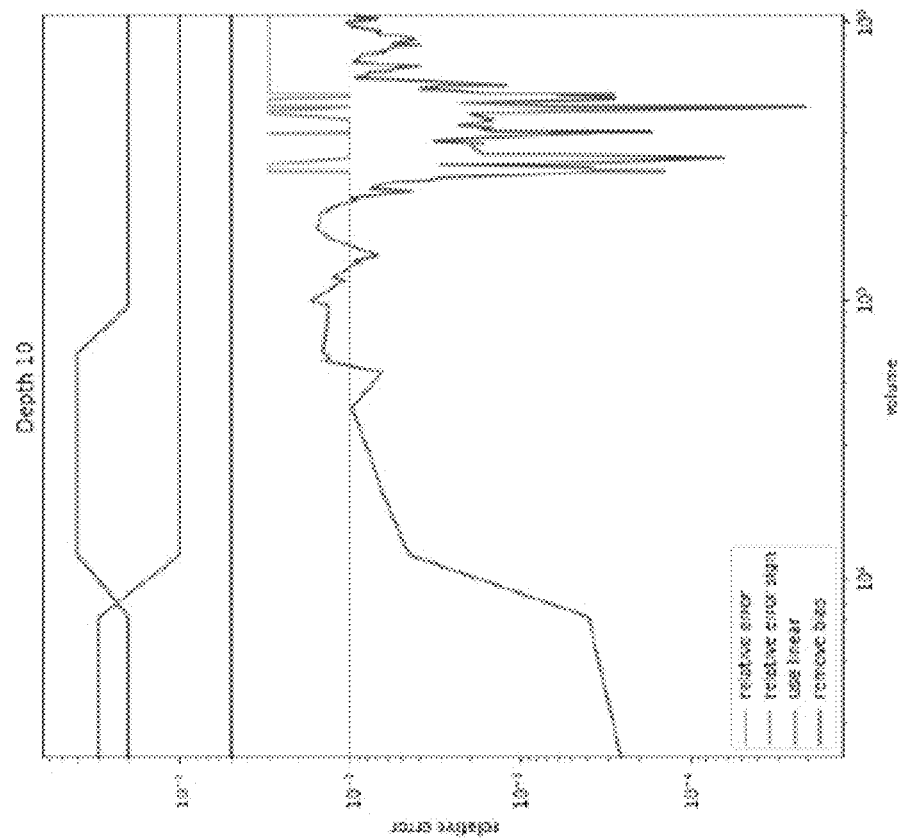
FIGS. 15A and 15B depict example experimental data from pseudo-multinomial sampling of virtual identifiers.
Figure 15A:
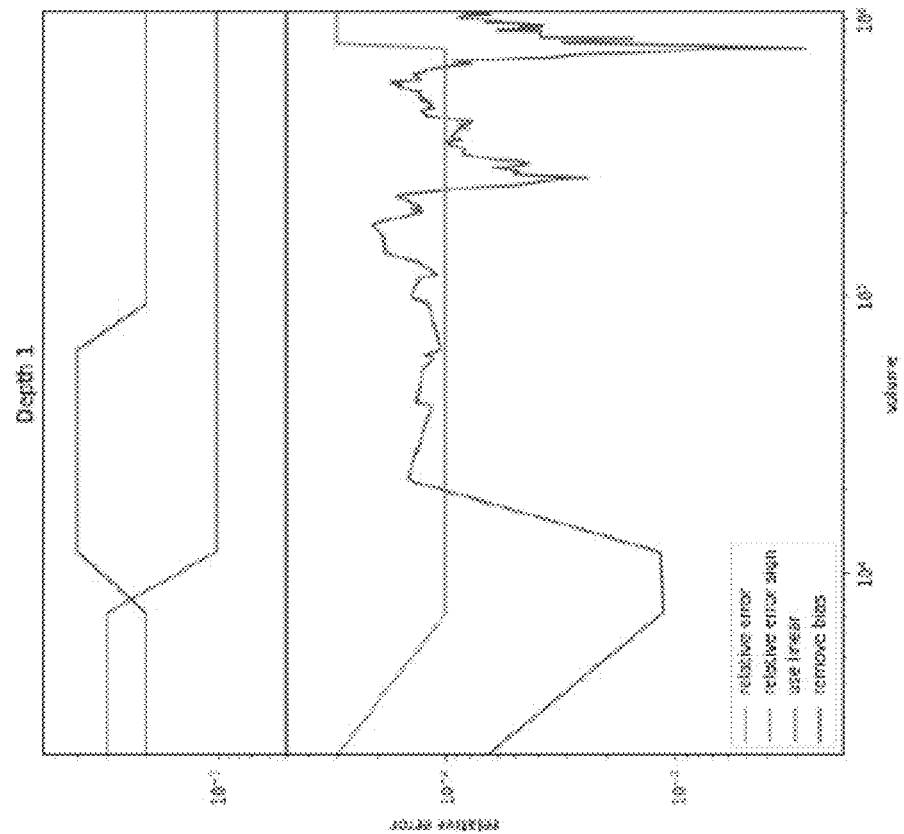

FIGS. 15A and 15B describe a plot of the relative error of a union of disjoint subsets. In an example, non-limiting implementation, for depth D=1 the relative error can be reduced from 2% to %1.

In a collapsed label implementation, when sketch $S_d$ for $d \in [1, D]$ is used, the data processing system can copy its collapsed label set. Otherwise, the label set of $S_1$ can be used.

Frequency and Behavior

Frequency can be accumulated on the matched byte hash. Similarly, the data processing system 105 can take the byte hash, and even behavior, of sketch $S_d$ a for $d \in [1, D]$. Otherwise, the sampled byte hash can be used because it is part of the sampled virtual sketch.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for cross media reporting by fast merging of panelist activity, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
   maintaining, by a data processing system comprising one or more processors and a memory, a plurality of panelist identifiers each stored in association with a respective plurality of offline content event identifiers;
   identifying, by the data processing system, from the plurality of panelist identifiers, a subset of the plurality of panelist identifiers that are stored with a respective offline content event of the respective plurality of offline content events that matches a target offline content event;
   mapping, by the data processing system, each of the subset of the plurality of panelist identifiers to a respective plurality of unique identifiers corresponding to virtual devices having virtual device attributes, wherein each unique identifier of the respective plurality of identifiers is associated with one panelist identifier of the subset of the plurality of panelist identifiers;
   generating, by the data processing system, a sketch for each of the subset of the plurality of panelist identifiers based on the respective plurality of unique identifiers;
   combining, by the data processing system, the sketch of each of the subset of the plurality of panelist identifiers into an aggregated sketch; and
   transmitting, by the data processing system, the aggregated sketch to a computing device for analysis with an aggregated sketch representing online content events,
   wherein generating the sketch for each of the subset of the plurality of panelist identifiers further comprises reducing, by the data processing system, for each of the subset of the plurality of panelist identifiers, the respective plurality of unique identifiers to the sketch that represents the respective plurality of unique identifiers further based on a sampling technique.

2. The method of claim 1, wherein the sampling technique is deep-sketch subsampling.

3. The method of claim 1, further comprising determining, by the data processing system, a weight for each of the plurality of panelist identifiers.

4. The method of claim 3, wherein mapping each of the subset of the plurality of panelist identifiers to the respective plurality of unique identifiers is further based on the weight for each of the subset of the plurality of panelist identifiers.

5. The method of claim 1, wherein combining the sketch of each of the subset of the plurality of panelist identifiers into the aggregated sketch further comprises determining, by the data processing system, a maximum register value across the sketches of each of the subset of the plurality of panelist identifiers.

6. The method of claim 5, wherein combining the sketch of each of the subset of the plurality of panelist identifiers into the aggregated sketch further comprises selecting, by the data processing system, a value of a position corresponding to the maximum register value for each position across the sketches of each of the subset of the plurality of panelist identifiers as a value of a corresponding position in the aggregated sketch.

7. The method of claim 1, wherein generating the sketch for each of the subset of the plurality of panelist identifiers further comprises generating, by the data processing system, a Hyper-Log-Log (HLL) sketch for each of the subset of the plurality of panelist identifiers.

8. The method of claim 1, wherein mapping each panelist identifier of the subset of the plurality of panelist identifiers to the respective plurality of unique identifiers is further based on matching, by the data processing system, attribute data of the panelist identifier to attribute data of each of the respective plurality of unique identifiers.

9. The method of claim 1, wherein maintaining the plurality of panelist identifiers each stored in association with the respective plurality of offline content event identifiers further comprises:
receiving, by the data processing system, a message from a panelist computing device corresponding to a panelist identifier of the plurality of panelist identifiers, the message identifying a respective offline event; and
storing, by the data processing system, an identifier of the respective offline event identified in the message in association with the panelist identifier.

10. A system, comprising:
a data processing system comprising one or more processors coupled to memory, the data processing system configured to:
maintain a plurality of panelist identifiers each stored in association with a respective plurality of offline content event identifiers;
identify, from the plurality of panelist identifiers, a subset of the plurality of panelist identifiers that are stored with a respective offline content event of the respective plurality of offline content events that matches a target offline content event;
map each of the subset of the plurality of panelist identifiers to a respective plurality of unique identifiers corresponding to virtual devices having virtual device attributes, wherein each unique identifier of the respective plurality of identifiers is associated with one panelist identifier of the subset of the plurality of panelist identifiers;
generate a sketch for each of the subset of the plurality of panelist identifiers based on the respective plurality of unique identifiers;
combine the sketch of each of the subset of the plurality of panelist identifiers into an aggregated sketch; and
transmit the aggregated sketch to a computing device for analysis with an aggregated sketch representing online content events,
wherein to generate the sketch for each of the subset of the plurality of panelist identifiers, the data processing system is further configured to reduce, for each of the subset of the plurality of panelist identifiers, the respective plurality of unique identifiers to the sketch that represents the respective plurality of unique identifiers further based on a sampling technique.

11. The system of claim 10, wherein the sampling technique is deep-sketch subsampling.

12. The system of claim 10, wherein the data processing system is further configured to determine a weight for each of the plurality of panelist identifiers.

13. The system of claim 12, wherein the data processing system is further configured to map each of the subset of the plurality of panelist identifiers to the respective plurality of unique identifiers further based on the weight for each of the subset of the plurality of panelist identifiers.

14. The system of claim 10, wherein to combine the sketch of each of the subset of the plurality of panelist identifiers into the aggregated sketch, the data processing system is further configured to determine a maximum register value across the sketches of each of the subset of the plurality of panelist identifiers.

15. The system of claim 14, wherein to combine the sketch of each of the subset of the plurality of panelist identifiers into the aggregated sketch, the data processing system is further configured to select a value of a position corresponding to the maximum register value for each position across the sketches of each of the subset of the plurality of panelist identifiers as a value of a corresponding position in the aggregated sketch.

16. The system of claim 10, wherein to generate the sketch for each of the subset of the plurality of panelist identifiers, the data processing system is further configured to generate a Hyper-Log-Log (HLL) sketch for each of the subset of the plurality of panelist identifiers.

17. The system of claim 10, wherein to map each panelist identifier of the subset of the plurality of panelist identifiers to the respective plurality of unique identifiers, the data processing system is further configured to match attribute data of the panelist identifier to attribute data of each of the respective plurality of unique identifiers.

18. The system of claim 10, wherein to maintain the plurality of panelist identifiers each stored in association with the respective plurality of offline content event identifiers, the data processing system is further configured to:
receive a message from a panelist computing device corresponding to a panelist identifier of the plurality of panelist identifiers, the message identifying a respective offline event; and
store an identifier of the respective offline event identified in the message in association with the panelist identifier.

* * * * *